(12) United States Patent
Arakawa

(10) Patent No.: US 10,406,836 B2
(45) Date of Patent: Sep. 10, 2019

(54) IMAGE RECORDING APPARATUS

(71) Applicant: BROTHER KOGYO KABUSHIKI KAISHA, Nagoya-shi, Aichi-ken (JP)

(72) Inventor: Yuta Arakawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/939,436

(22) Filed: Mar. 29, 2018

(65) Prior Publication Data
US 2018/0281482 A1 Oct. 4, 2018

(30) Foreign Application Priority Data

Mar. 31, 2017 (JP) ................... 2017-072996

(51) Int. Cl.
| | |
|---|---|
| *B41J 19/20* | (2006.01) |
| *H04N 1/053* | (2006.01) |
| *H04N 1/12* | (2006.01) |
| *B41J 2/165* | (2006.01) |

(52) U.S. Cl.
CPC ......... *B41J 19/205* (2013.01); *B41J 2/16508* (2013.01); *B41J 2/16511* (2013.01); *B41J 2/16517* (2013.01); *H04N 1/053* (2013.01); *H04N 1/126* (2013.01); *H04N 2201/04727* (2013.01); *H04N 2201/04729* (2013.01); *H04N 2201/04755* (2013.01); *H04N 2201/04789* (2013.01); *H04N 2201/04793* (2013.01)

(58) Field of Classification Search
CPC .. B41J 19/205; B41J 2/16508; B41J 2/16517; B41J 2/16511; H04N 1/126; H04N 1/053; H04N 2201/04727; H04N 2201/04789; H04N 2201/04729; H04N 2201/04793; H04N 2201/04755
See application file for complete search history.

(56) References Cited

U.S. PATENT DOCUMENTS

| | | | |
|---|---|---|---|
| 2003/0063325 | A1 | 4/2003 | Takahashi |
| 2013/0257987 | A1 | 10/2013 | Wakakusa |
| 2016/0288549 | A1* | 10/2016 | Hatakeyama ............ B41J 29/38 |

FOREIGN PATENT DOCUMENTS

| | | |
|---|---|---|
| JP | 3091271 U | 1/2003 |
| JP | 2003-108229 A | 4/2003 |
| JP | 2005-280284 A | 10/2005 |
| JP | 2013-108720 A | 10/2013 |

* cited by examiner

*Primary Examiner* — Bradley W Thies
(74) *Attorney, Agent, or Firm* — Merchant & Gould P.C.

(57) ABSTRACT

In an image recording apparatus, a peak load that is the highest load applied to a carriage moving in a first direction in a first load region is highest at a first highest-load position. A second load is highest at a second highest-load position of a second load region. In a retry processing, when a stop position of the carriage which is detected by a detector is located between the first highest-load position and the second highest-load position, the controller moves the carriage in the first direction toward a target position after moving the carriage from the stop position in a second direction to a first retry position located downstream of a restoration position in the first direction.

11 Claims, 14 Drawing Sheets

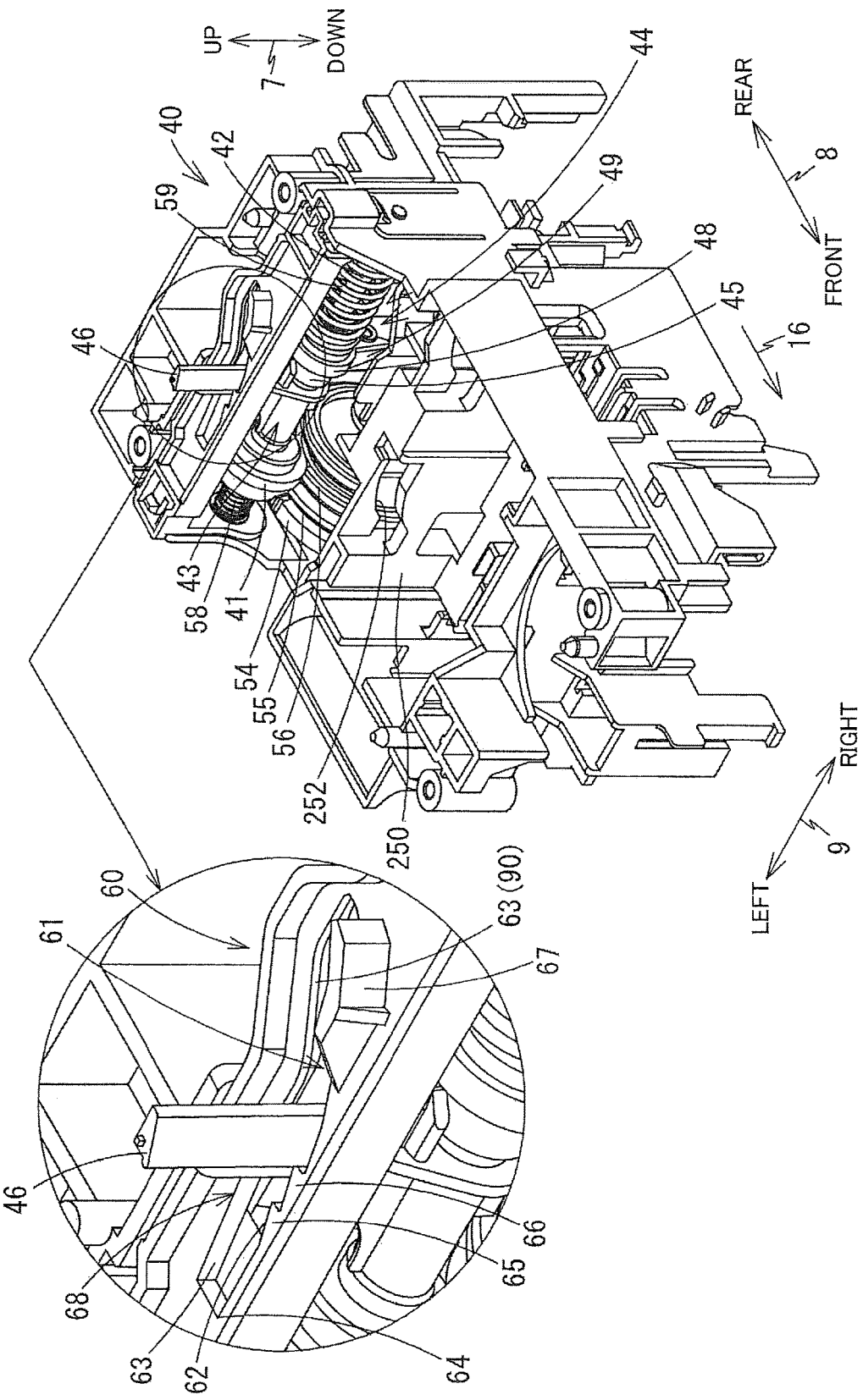

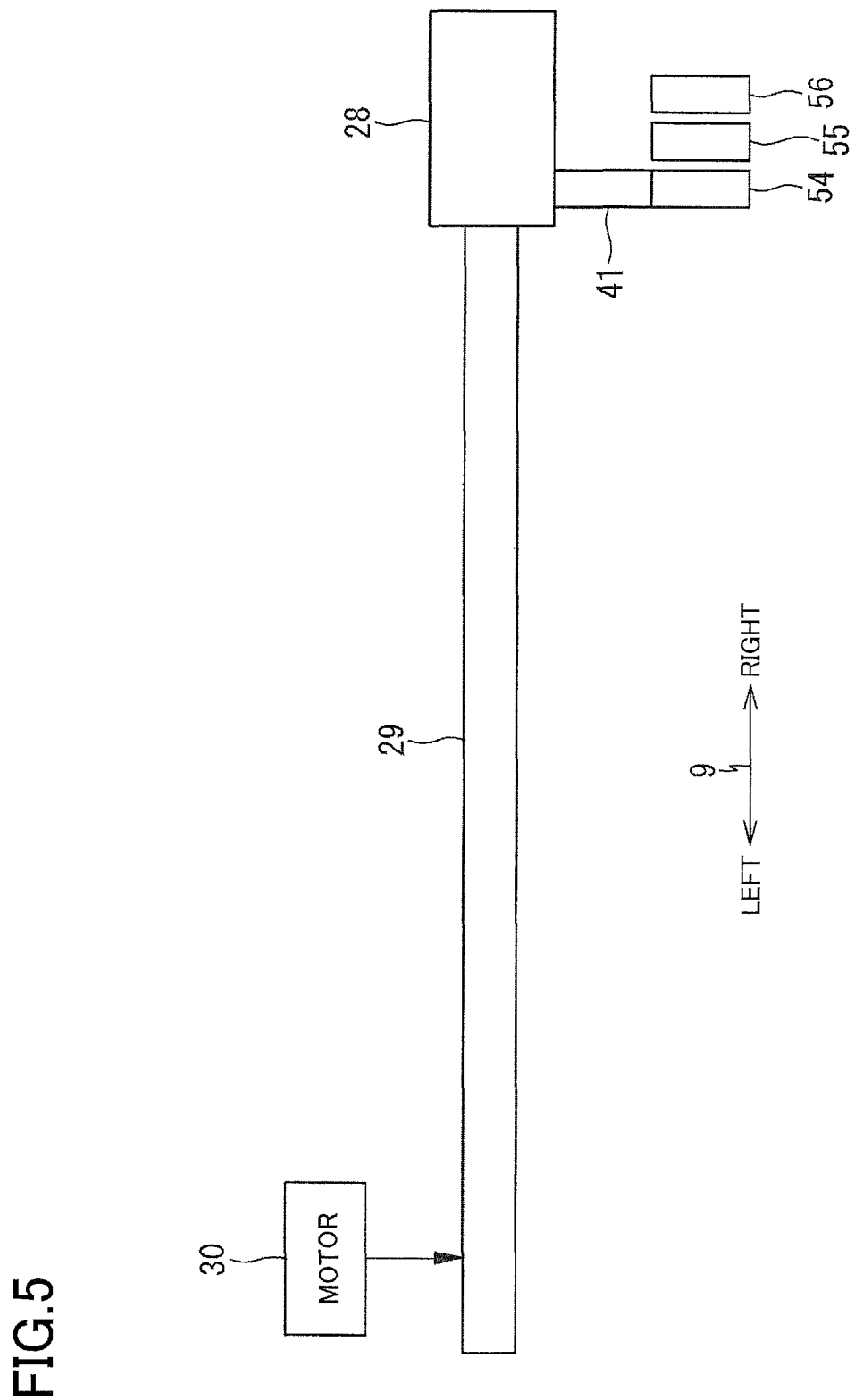

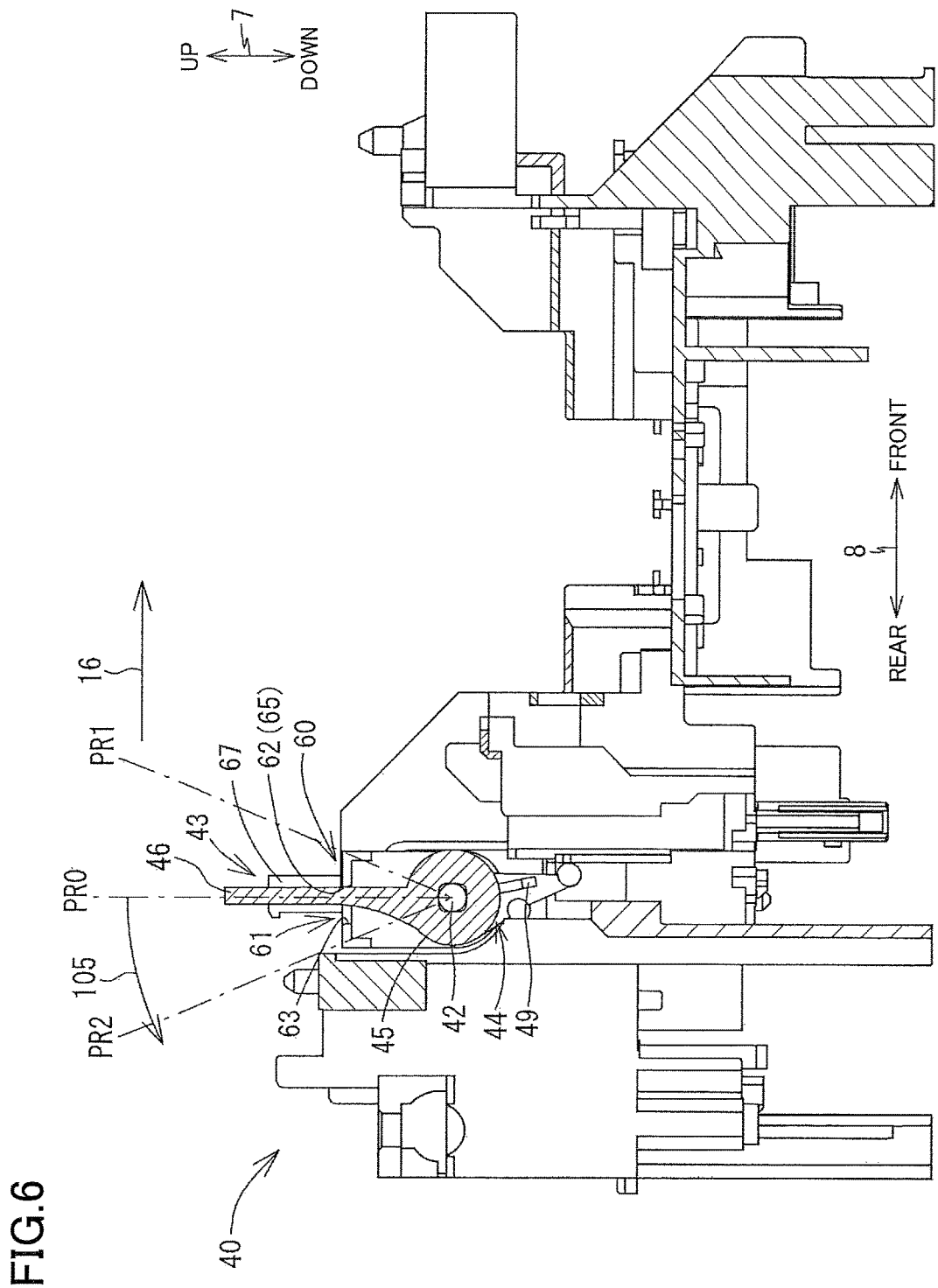

R1 FIRST LOAD REGION
R2 SECOND LOAD REGION
P0 ORIGIN POSITION
P1 CAPPING POSITION
P2 SECOND HIGHEST-LOAD POSITION
P3 SECOND STARTING POSITION
P4 FIRST HIGHEST-LOAD POSITION
P5 FIRST RETRY POSITION
P6 FIRST RETRY POSITION
P7 RESTORATION POSITION
P8 FIRST STARTING POSITION
P9 SECOND RETRY POSITION

IMAGE RECORDING APPARATUS

CROSS REFERENCE TO RELATED APPLICATION

The present application claims priority from Japanese Patent Application No. 2017-072996, which was filed on Mar. 31, 2017, the disclosure of which is herein incorporated by reference in its entirety.

BACKGROUND

The following disclosure relates to an image recording apparatus including a carriage supporting an image recorder.

There is conventionally known a printer including an ink-jet recording head having nozzles, a cap capable of capping the recording head, and a capping lever that is pushed and moved by a carriage moved to a capping position. In this printer, the cap is moved upward in conjunction with movement of the capping lever to cap the recording head. In this printer, in the case where the carriage moved toward the capping position is stopped in front of the capping position, a motor is driven, as a retry processing, such that the carriage is temporarily moved back to a release position, then moved to the capping position at a constant speed, and then decelerated.

SUMMARY

Not only the capping but also other operations may cause the carriage to be stopped due to a load in the case where the carriage is moved toward a target position.

There is known an image recording apparatus including a switching lever for supplying an output of one drive source selectively to one of a plurality of driven components. In this image recording apparatus, the switching lever is brought into contact with the carriage to perform the switching of the output with movement of the carriage. In this image recording apparatus, the switching lever is a load for movement of the carriage. For the above-described image recording apparatus that executes the retry processing with consideration of only the capping as a load, it is difficult to efficiently execute the retry processing in accordance with the load caused by the switching lever.

Accordingly, an aspect of the disclosure relates to an image recording apparatus capable of executing a retry processing in accordance with a load generation source.

In one aspect of the disclosure, an image recording apparatus includes: a carriage supporting an image recorder; a driving member configured to move the carriage along a moving path; a detector configured to detect a position of the carriage in the moving path and presence or absence of a stop of the carriage; a first load applier configured to apply a first load to the carriage moving in a first direction, by contacting the carriage moving in the first direction in a first load region of the moving path; a second load applier configured to apply a second load, different from the first load, to the carriage moving in the first direction in a second load region located downstream of the first load region in the first direction in the moving path; and a controller configured to control the driving member. A peak load that is a highest load applied to the carriage moving in the first direction in the first load region is highest at a first highest-load position of the first load region, and the peak load is restored at the first highest-load position when the carriage is moved to a position located downstream of the first highest-load position in the first direction, thereafter moved, in a second direction opposed to the first direction, over a restoration position located downstream of the first highest-load position in the second direction, and thereafter moved in the first direction again. The second load is highest at a second highest-load position of the second load region. The controller is configured to execute: a moving processing in which the controller moves the carriage from a position located upstream of the first load region in the first direction, toward a target position located downstream of the second load region in the first direction; and a retry processing in which the controller moves the carriage to the target position again when the detector detects a stop of the carriage in the moving processing, and a stop position of the carriage which is detected by the detector is different from the target position, and wherein in the retry processing, when the stop position of the carriage which is detected by the detector is located between the first highest-load position and the second highest-load position, the controller moves the carriage in the first direction toward the target position after moving the carriage from the stop position in the second direction to a first retry position located downstream of the restoration position in the first direction.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 4 is a perspective view of a construction of a drive switching mechanism;

FIG. 5 is a schematic view illustrating arrangement of a rotation shaft, a drive gear, a switch gear, and transmission gears;

FIG. 6 is a cross-sectional view obtained by cutting the drive switching mechanism at a lever member;

DETAILED DESCRIPTION OF THE EMBODIMENTS

Figure 1:
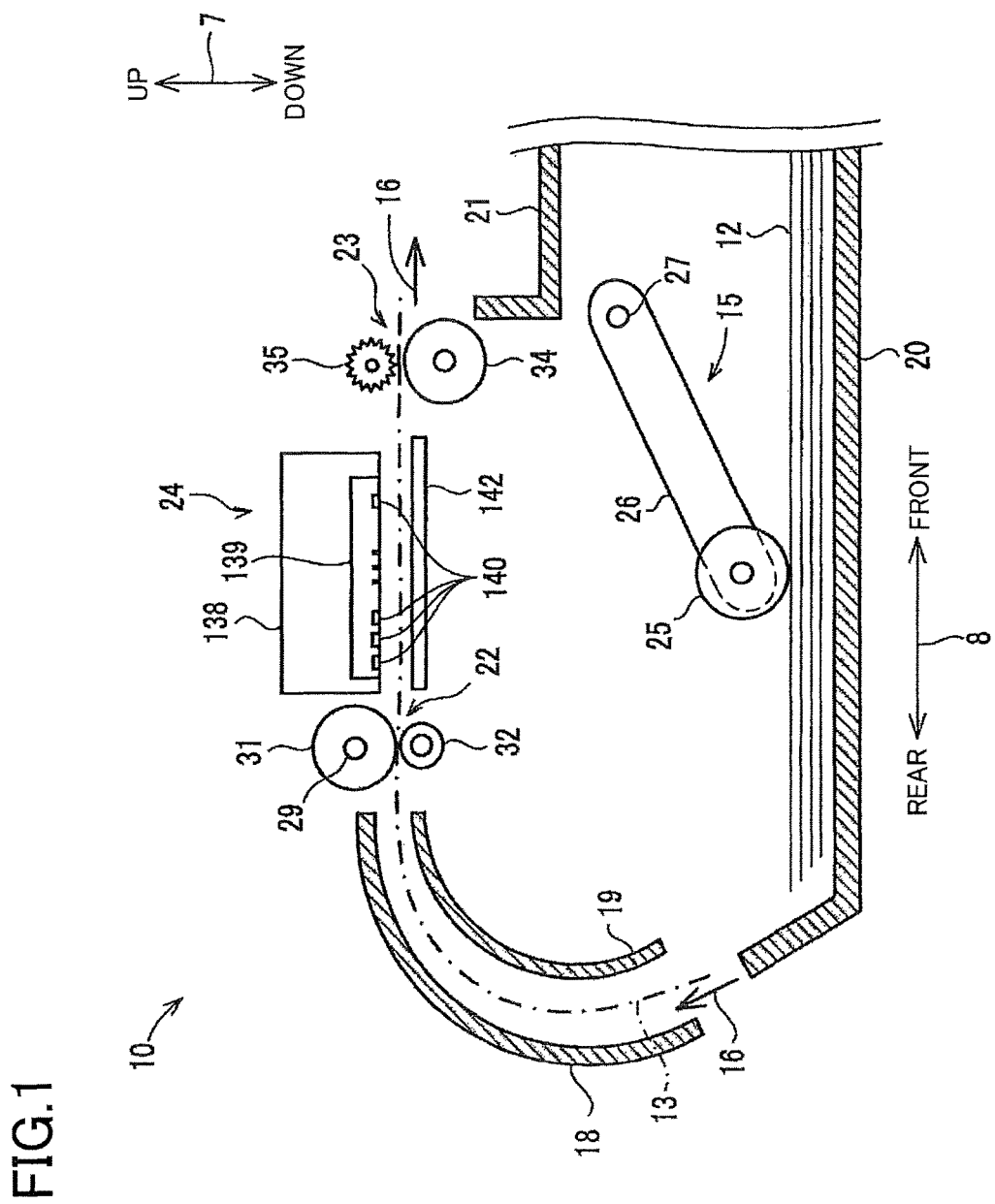
FIG. 1 is an elevational view in vertical cross section schematically illustrating an internal structure of a printer according to a first embodiment.

Hereinafter, there will be described embodiments by reference to the drawings. It is to be understood that the following embodiments are described only by way of example, and the disclosure may be otherwise embodied with various modifications without departing from the scope and spirit of the disclosure. FIG. 1 illustrates a printer 10 placed on a horizontal plane. The printer 10 is used in this state. In the following description, an up and down direction 7 is defined in this state. Also, a front and rear direction 8 is defined by regarding a side of the printer 10 on which an output tray 21 is provided as a front side (a front surface). A right and left direction 9 is defined in a state in which the printer 10 is viewed from the front. In the using state of the printer 10, in the present embodiment, the up and down direction 7 corresponds to the vertical direction, and each of the front and rear direction 8 and the right and left direction 9 corresponds to the horizontal direction.

First Embodiment

There will be described the printer 10 according to a first embodiment.
Overall Configuration of Printer 10

As illustrated in FIG. 1, the printer 10 is an ink-jet image recording apparatus configured to record an image on a sheet 12. The printer 10 includes a supplier 15, a supply tray 20, the output tray 21, a first conveyor 22, a second conveyor 23, an image recorder 24, and a platen 142. The printer 10 may also have other functions such as a facsimile function and a scanning function.
Supply Tray 20 and Output Tray 21

The supply tray 20 is mountable in a lower portion of the printer 10 and insertable and removable in the front and rear direction 8. The supply tray 20 supports the sheets 12 stacked on each other. The output tray 21 is located above the supply tray 20. The output tray 21 supports the sheet 12 conveyed between the image recorder 24 and the platen 142 and discharged by the second conveyor 23.
Supplier 15

As illustrated in FIG. 1, the supplier 15 includes a supply roller 25, a supply arm 26, and a shaft 27. The supplier 15 supplies the sheet 12 supported on the supply tray 20, to a conveyance path 13. The supply roller 25 is rotatably supported by a distal end portion of the supply arm 26. The supply roller 25 is forwardly rotated by a conveying motor 30 (see FIG. 3). The supply arm 26 is pivotably supported by the shaft 27 supported by a frame of the printer 10. The supply arm 26 is urged by its own weight or a resilient force of, e.g., a spring so as to pivot toward the supply tray 20.

The forward rotation of the supply roller 25 is rotation of the supply roller 25 in a direction in which the supply roller 25 conveys the sheet 12 in a conveying direction 16. In the following description, in the case where the wording "forward rotation" is used for each roller other than the supply roller 25, the forward rotation also indicates rotation in a direction in which the sheet 12 is conveyed in the conveying direction 16.
Conveyance Path 13

As illustrated in FIG. 1, the conveyance path 13 makes an upward U-turn while extending upward from a rear end portion of the supply tray 20 and extends frontward to the output tray 21 via a space between the image recorder 24 and the platen 142. The printer 10 includes an outer guide member 18 and an inner guide member 19 opposed to each other with a space therebetween. A space between the outer guide member 18 and the inner guide member 19 forms the U-turn portion of the conveyance path 13. A portion of the conveyance path 13 between the first conveyor 22 and the second conveyor 23 is located at a generally central portion of the printer 10 in the right and left direction 9 and extends in the front and rear direction 8. In FIG. 1, the conveying direction 16 is indicated by the arrows provided along the conveyance path 13.
First Conveyor 22 and Second Conveyor 23

As illustrated in FIG. 1, the first conveyor 22 is located upstream of the image recorder 24 in the conveying direction 16. The first conveyor 22 includes a conveying roller 31 and a pinch roller 32 opposed to each other. The conveying roller 31 is located over the pinch roller 32. The sheet 12 is nipped by the conveying roller 31 and the pinch roller 32. The construction of the first conveyor 22 is described later in detail with reference to FIG. 4. The conveying roller 31 is driven by the conveying motor 30 (see FIGS. 3 and 4). The pinch roller 32 is rotated by rotation of the conveying roller 31. The nipped sheet 12 is conveyed in the conveying direction 16 by the conveying roller 31 and the pinch roller 32 rotated forwardly by the conveying motor 30.

The second conveyor 23 is located downstream of the image recorder 24 in the conveying direction 16. The second conveyor 23 includes an output roller 34 and a spur 35 opposed to each other. The spur 35 is located on an upper side of the output roller 34. The sheet 12 is nipped by the output roller 34 and the spur 35. The output roller 34 is driven by the conveying motor 30. The spur 35 is rotated by rotation of the output roller 34. The nipped sheet 12 is conveyed in the conveying direction 16 by the output roller 34 and the spur 35 rotated forwardly by the conveying motor 30.
Platen 142

As illustrated in FIG. 1, the platen 142 is disposed between the first conveyor 22 and the second conveyor 23 in the conveying direction 16. The image recorder 24 and the platen 142 are opposed to each other in the up and down direction 7, with the conveyance path 13 therebetween. The image recorder 24 is located on an upper side of the platen 142. The platen 142 disposed under the image recorder 24 defines a lower surface of a portion of the conveyance path 13.
Image Recorder 24

As illustrated in FIG. 1, the image recorder 24 is disposed between the first conveyor 22 and the second conveyor 23 in the conveying direction 16. The image recorder 24 includes a carriage 138 and a recording head 139.

Figure 2:
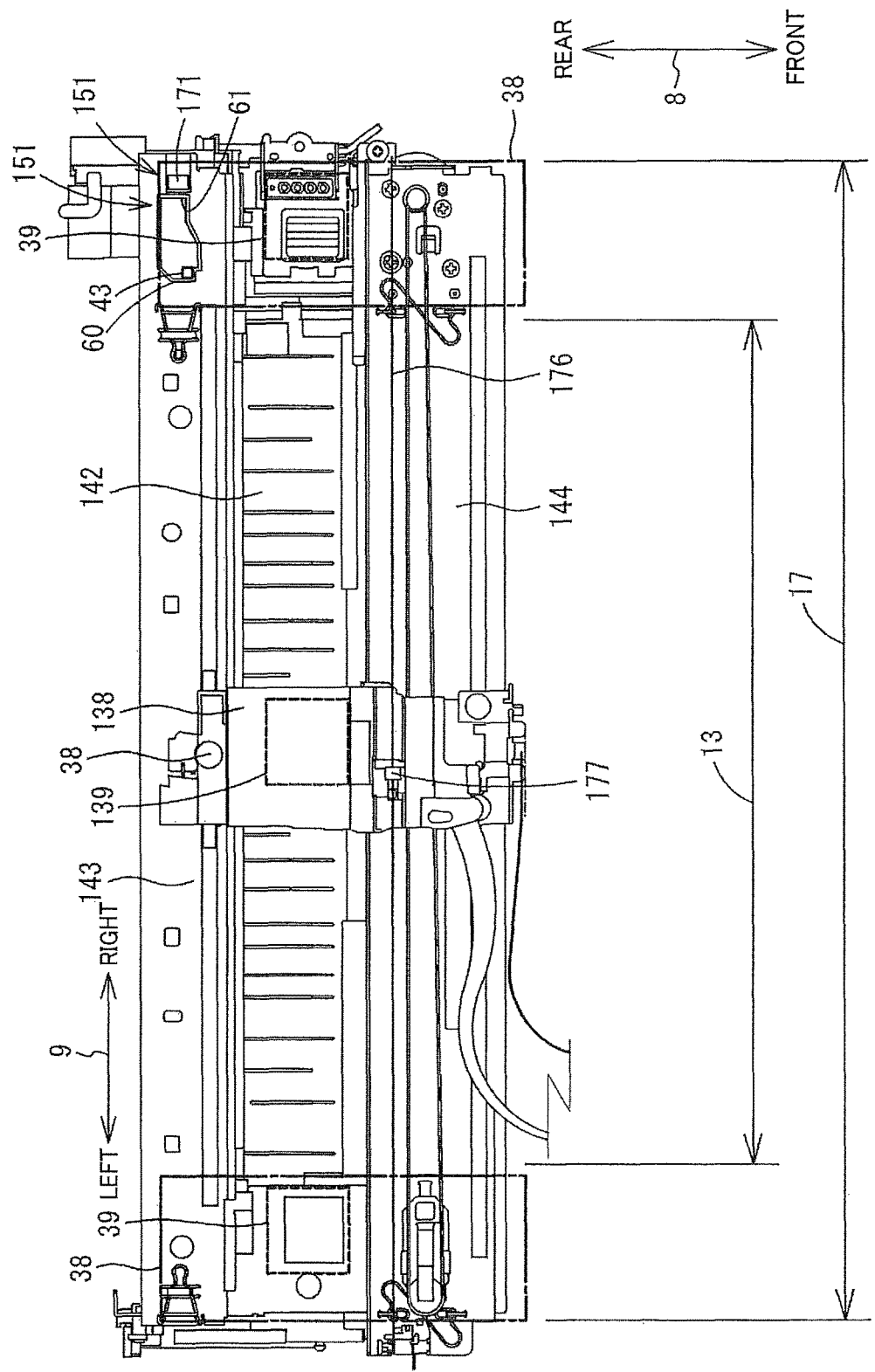
FIG. 2 is a plan view illustrating a moving path of a carriage.

As illustrated in FIG. 2, the carriage 138 is supported on guide rails 143, 144 spaced apart from each other in the front and rear direction 8 and each extending in the right and left direction 9. The guide rails 143, 144 are supported by the frame of the printer 10. The carriage 138 is coupled to a well-known belt mechanism provided on the guide rail 144. The belt mechanism is driven by a carriage drive motor 173 (see FIG. 3) as one example of a driving member. The carriage 138 coupled to the belt mechanism is reciprocated in the right and left direction 9 by the carriage motor. A path 17 for movement of the carriage 138 (hereinafter may be referred to as "carriage moving path 17") is defined along the right and left direction 9 coinciding with a main scanning direction. The carriage moving path 17 extends between opposite ends of each of the guide rails 143, 144. In the right and left direction, the conveyance path 13 is a portion of the carriage moving path 17 and located at a central portion of the carriage moving path 17.

As illustrated in FIG. 1, the recording head 139 is mounted on the carriage 138. A lower surface of the recording head 139 has a multiplicity of nozzles 140. Distal ends of the nozzles 140 are exposed from the lower surface of the recording head 139. The nozzles 140 are located downstream of the conveying roller 31 and the pinch roller 32 in the conveying direction 16. The recording head 139 ejects ink from the nozzles 140 as fine ink droplets. During movement of the carriage 138, the recording head 139 ejects the ink droplets onto the sheet 12 supported on the platen 142. As a result, an image is recorded on the sheet 12.

Control Configuration of Printer 10

Figure 3:
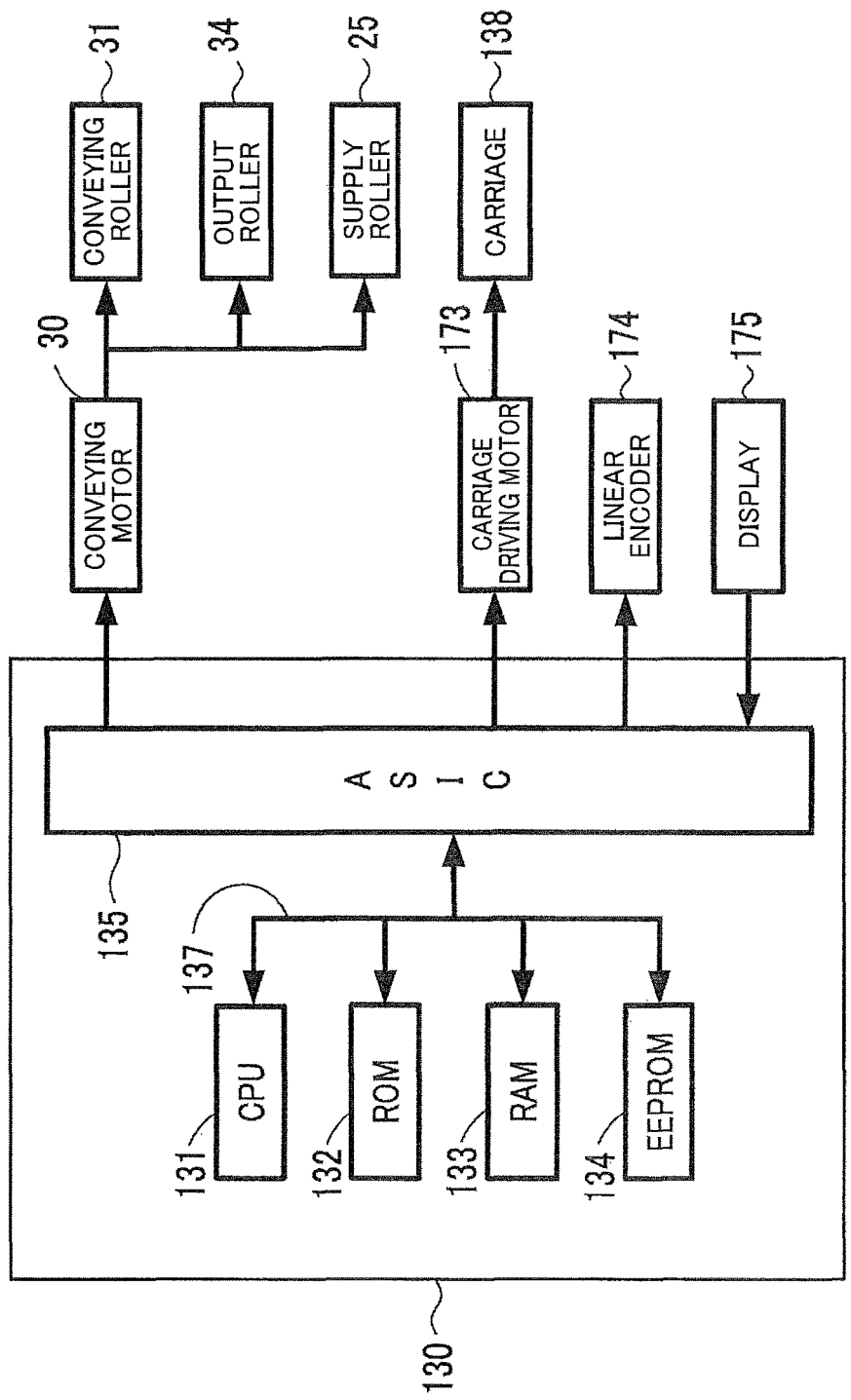
FIG. 3 is a block diagram illustrating a control configuration of the printer.

There will be next described a control configuration of the printer 10 with reference to FIG. 3. A controller 130 controls overall operations of the printer 10. The controller 130 includes a central processing unit (CPU) 131, a read-only memory (ROM) 132, a random-access memory (RAM) 133, an electrically erasable programmable ROM (EEPROM) 134, an application-specific integrated circuit (ASIC) 135, and an internal bus 137 that connects these devices to each other.

The ROM 132 stores programs for the CPU 131 to control various operations and processings including recording control, for example. The RAM 133 is used as a storage area for temporarily storing information, such as data and signals, used by the CPU 131 for executing the above-described programs. The EEPROM 134 stores flags and settings which are to be kept even after a power source is turned off, for example.

The conveying motor 30 and the carriage drive motor 173 are connected to the ASIC 135. Drive circuits for controlling the motors 30, 173 are incorporated in the ASIC 135. When a drive signal for rotating one of the motors is input from the CPU 131 to the drive circuit corresponding to the motor, a drive current related to the drive signal is output from the drive circuit to the corresponding motor to rotate the corresponding motor. That is, the controller 130 controls the motors 30, 173.

The recording head 139 is connected to the ASIC 135. The recording head 139 is operated by receiving electricity from the controller 130 via a drive circuit, not illustrated. The controller 130 controls supply of the electricity to the recording head 139 such that the recording head 139 ejects the ink droplets from the nozzles 140 selectively.

As illustrated in FIG. 3, the printer 10 includes a linear encoder 174 connected to the ASIC 135. The linear encoder 174 is a sensor configured to detect movement of the carriage 138 in the right and left direction 9. As illustrated in FIG. 2, the linear encoder 174 includes: an encoder strip 176 supported by the guide rail 144 so as to extend in the right and left direction 9; and an optical sensor 177 mounted on the carriage 138 to optically detect the encoder strip 176. The encoder strip 176 has light transmitting portions and light intercepting portions arranged alternately in the right and left direction 9. The light transmitting portions allow light emitted from the optical sensor 177 to pass through. The light intercepting portions intercept the light emitted from the optical sensor 177. Movement of the carriage 138 moves the optical sensor 177 relative to the encoder strip 176 in the right and left direction 9, whereby the optical sensor 177 detects the light transmitting portions and the light intercepting portions of the encoder strip 176 alternately and outputs pulse signals.

The controller 130 counts the number of pulses output from the linear encoder 174, enabling calculation of a distance from an origin position P0 (see FIG. 11) to a current position of the carriage 138. The origin position P0 is located at a right end of the carriage moving path 17. Here, when the carriage 138 is moved away from the origin position P0, the controller 130 performs an addition to the counted number of the output pulses. When the carriage 138 is moved toward the origin position P0, the controller 130 performs a subtraction from the counted number of the output pulses. Also, the controller 130 is capable of detecting whether the carriage 138 is at rest, based on the presence or absence of the pulse output from the linear encoder 174. Specifically, the controller 130 determines that the carriage 138 is at rest in the case where the controller 130 transmits a drive signal to the carriage drive motor 173 and receives no pulses or ceases receiving the pulses from the linear encoder 174 in a particular period corresponding to the transmitted drive signal, for example. That is, the linear encoder 174 and the controller 130 serve as a detector configured to detect a distance of movement of the carriage 138 and also detect the presence or absence of a stop of the carriage 138.

As illustrated in FIG. 3, the printer 10 includes a display 175 connected to the ASIC 135. The display 175 is capable of displaying an image based on an instruction transmitted from the controller 130.

Drive Switching Mechanism 40

As illustrated in FIG. 2, the printer 10 includes a drive switching mechanism 40 (as one example of a first load applier) on the carriage moving path 17. The drive switching mechanism 40 is disposed to the right of the platen 142. The drive switching mechanism 40 transmits the driving force supplied from the motor 30, selectively to one of the supply roller 25, the conveying roller 31, and the other driving members.

As illustrated in FIG. 4, the drive switching mechanism 40 includes a drive gear 28, a switch gear 41, transmission gears 54, 55, 56, a lever member 43 as one example of a switching lever, an urging switching member 44, a first spring 58, a second spring 59, and a lever guide 60.

As illustrated in FIG. 5, the output of the motor 30 is input to a rotation shaft 29 of the conveying roller 31 via a belt, for example. An end portion of the rotation shaft 29 is disposed such that the drive gear 28 is rotated coaxially and integrally with the rotation shaft 29. That is, the drive gear 28 is rotated by power transmitted from the motor 30.

The switch gear 41 is engaged with the drive gear 28. The switch gear 41 is rotated based on the output of the motor 30. As illustrated in FIG. 4, the switch gear 41 is supported by a shaft 42 slidably in the right and left direction 9. That is, the axial direction of the shaft 42 is directed along the right and left direction 9. The axial direction of the shaft 42 is parallel with the axial direction of the drive gear 28. The length of the drive gear 28 in the right and left direction 9 is sufficiently large with respect to a range of sliding of the switch gear 41. Thus, the switch gear 41 and the drive gear 28 are in constant engagement with the range of sliding of the switch gear 41.

The transmission gears 54, 55, 56 are disposed under the shaft 42. The transmission gears 54, 55, 56 are arranged in parallel in the right and left direction 9. The transmission gears 54, 55, 56 are rotatably supported by a support shaft, not illustrated, extending parallel with the shaft 42. The transmission gears 54, 55, 56 are rotatable independently of each other. The switch gear 41 is slid on the shaft 42 and thereby selectively engaged with one of the transmission gears 54, 55, 56.

In the present embodiment, the transmission gear 54 transmits the driving force of the motor 30 to the supply roller 25. The transmission gear 55 transmits the driving force of the motor 30 to the conveying roller 31. The transmission gear 56 transmits the driving force of the motor 30 to the output roller 34. Thus, the driving force of the motor 30 is transmitted selectively to one of the rollers 25, 31, 34 via one of the transmission gears 54, 55, 56.

Lever Member 43

As illustrated in FIG. 4, the lever member 43 is supported by the shaft 42. The lever member 43 is disposed to the right of the switch gear 41.

As illustrated in FIGS. 4 and 6, the lever member 43 includes a cylindrical shaft 45 and a lever arm 46. The cylindrical shaft 45 is fitted on the shaft 42. The lever arm 46 protrudes from the cylindrical shaft 45 in the radial direction of the shaft 42 (upward in the present embodiment). The cylindrical shaft 45 is rotatable and slidable in the axial direction of the shaft 42, i.e., in the right and left direction 9. That is, the lever member 43 is movable along the axis of the shaft 42 parallel with the carriage moving path 17 and is rotatable about the shaft 42.

Figure 7A:
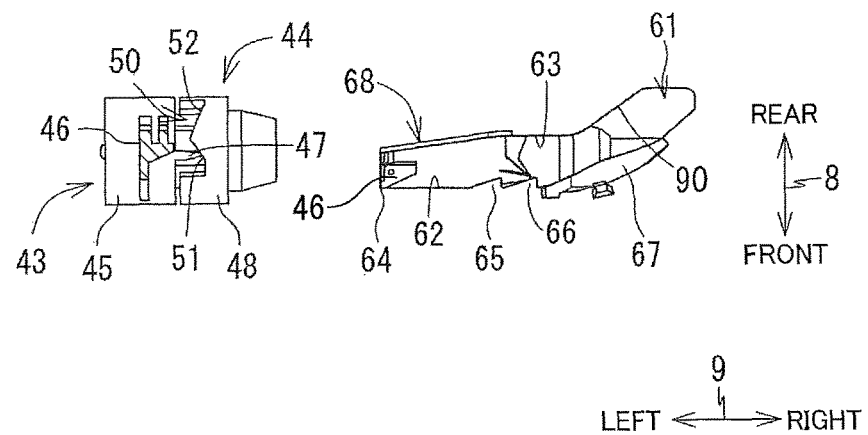
FIGS. 7A and 7B are views each illustrating an operation of the drive switching mechanism.
Figure 7B:
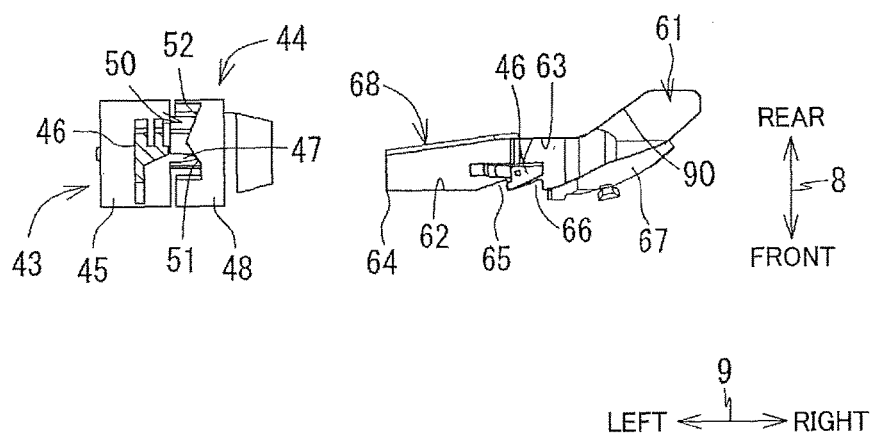

A left surface of the cylindrical shaft 45 is in contact with the switch gear 41. A right surface of the cylindrical shaft 45 is in contact with the urging switching member 44. As illustrated in FIGS. 7A and 7B, a rib 47 extends in the right and left direction 9 from an outer circumferential edge of the right surface of the cylindrical shaft 45.

Urging Switching Member 44

As illustrated in FIG. 4, the urging switching member 44 is supported by the shaft 42. The urging switching member 44 is disposed to the right of the lever member 43.

As illustrated in FIGS. 4 and 6, the urging switching member 44 includes a cylindrical shaft 48 and a switching arm 49. The cylindrical shaft 48 is fitted on the shaft 42. The switching arm 49 protrudes from the cylindrical shaft 48 in its radial direction (downward in the present embodiment). The cylindrical shaft 48 is rotatable, and slidable in the axial direction of the shaft 42, i.e., in the right and left direction 9. That is, the switching arm 49 is slidable in the right and left direction 9 and rotatable about the shaft 42.

A left surface of the cylindrical shaft 48 is in contact with the lever member 43. As illustrated in FIGS. 7A and 7B, a recessed cutout portion 50 is formed in an outer circumferential edge of the left surface of the cylindrical shaft 48.

A first inclined surface 51 and a second inclined surface 52 are formed in a back surface of the recessed cutout portion 50 of the urging switching member 44. The first inclined surface 51 and the second inclined surface 52 have a mountain shape protruding leftward. The first inclined surface 51 and the second inclined surface 52 are flat surfaces extending in the radial direction of the shaft 42. The first inclined surface 51 and the second inclined surface 52 are formed continuously in the circumferential direction of the shaft 42. The rib 47 of the lever member 43 is inserted in the recessed cutout portion 50. A distal end of the rib 47 is selectively in contact with one of the first inclined surface 51 and the second inclined surface 52.

First Spring 58 and Second Spring 59

As illustrated in FIG. 4, the first spring 58 and the second spring 59 (as one example of a first urging member) are fitted on the shaft 42. Each of the first spring 58 and the second spring 59 is a coil spring in the present embodiment. The first spring 58 and the second spring 59 are extended or contracted in the right and left direction 9.

The first spring 58 is disposed on the shaft 42 at a position located to the left of the switch gear 41. The first spring 58 resiliently urges the switch gear 41 rightward, i.e., in the right direction as one example of a first direction. That is, the switch gear 41 is resiliently urged toward the lever member 43.

The second spring 59 is disposed on the shaft 42 at a position located to the right of the urging switching member 44. The second spring 59 urges the urging switching member 44 leftward, i.e., in the left direction as one example of a second direction. That is, the urging switching member 44 is resiliently urged by the lever member 43.

With this construction, the switch gear 41 and the urging switching member 44 are urged toward the lever member 43 respectively by the first spring 58 and the second spring 59 in opposite directions. That is, the first spring 58 resiliently urges the lever member 43 via the switch gear 41, and the second spring 59 resiliently urges the lever member 43 via the urging switching member 44. As a result, the switch gear 41, the lever member 43, and the urging switching member 44 are in contact with each other on the shaft 42.

The urging force of the second spring 59 for urging the urging switching member 44 leftward is greater than the urging force of the first spring 58 for urging the switch gear 41. Thus, the switch gear 41, the lever member 43, and the urging switching member 44 are slid leftward on the shaft 42 without external forces applied. That is, the second spring 59 urges the switch gear 41, the lever member 43, and the urging switching member 44 leftward.

When a rightward external force is applied to the lever member 43, specifically, when the carriage 138 contacts and pushes the lever arm 46 rightward as will be described below, the urging switching member 44 is pushed and moved rightward by the lever arm 46. When the lever arm 46 is moved rightward, the switch gear 41 is moved rightward, following the lever arm 46, by the urging force of the first spring 58. In the construction described above, the switch gear 41 is slid in the right and left direction 9 in accordance with the sliding of the lever member 43.

Lever Guide 60

As illustrated in FIGS. 4 and 6, the lever guide 60 is disposed over the shaft 42. The lever guide 60 is fixed to a guide rail 143 (see FIG. 2). The lever guide 60 is shaped substantially like a flat plate. The lever guide 60 has an elongated hole 61 elongated in the right and left direction 9. The lever arm 46 of the lever member 43 is inserted in the elongated hole 61. The lever arm 46 inserted in the elongated hole 61 protrudes to a position above the guide rail 143. An upper side of the elongated hole 61 is an area through which the carriage 138 is moved (i.e., a portion of the carriage moving path 17). That is, the lever arm 46 protrudes to the carriage moving path 17.

A protruding end portion of the lever arm 46 is contacted and pushed by a guide piece 38 of the carriage 138 (see FIGS. 2 and 3) moving rightward. As illustrated in FIG. 2, the guide piece 38 protruding rearward is formed on a rear end portion of the carriage 138 (i.e., an upstream end portion thereof in the conveying direction 16). As a result, the lever arm 46 is moved rightward.

As will be described later, the switching arm 49 maintains a rotational position of the urging switching member 44 within a particular area with respect to the shaft 42. A relative positional relationship between the lever member 43 and the urging switching member 44 causes the rib 47 of the lever member 43 to selectively contact one of the first inclined surface 51 and the second inclined surface 52 of the recessed cutout portion 50 of the urging switching member 44.

Front and rear ends of the elongated hole 61 are respectively defined by a pair of first edge portion 62 and the second edge portion 63. The first edge portion 62 defines the front end of the elongated hole 61. The second edge portion 63 defines the rear end of the elongated hole 61. As will be described below, each of the first edge portion 62 and the second edge portion 63 is inclined with respect to the right and left direction 9 at a particular position. Each of the first edge portion 62 and the second edge portion 63 extends in the right and left direction 9 at positions other than the particular position.

As illustrated in FIG. 6, the lever member 43 is pivotable between a first pivot position PR1 and a second pivot position PR2. The first pivot position PR1 is a position of the axis of the lever member 43 when the lever member 43 is located at a frontmost inclined position in a state in which the lever member 43 is in contact with the first edge portion 62. The second pivot position PR2 is a position of the axis of the lever member 43 when the lever member 43 is located at a rearmost inclined position in a state in which the lever member 43 is in contact with the second edge portion 63. A neutral position PR0 is defined between the first pivot position PR1 and the second pivot position PR2. The neutral position PR0 is a position of the axis of the lever member 43 when the rib 47 is located at a boundary between the first inclined surface 51 and the second inclined surface 52.

As illustrated in FIGS. 7A and 7B, the first inclined surface 51 is inclined rightward with respect to a direction in which the lever arm 46 is rotated toward the first edge portion 62 of the elongated hole 61. The second inclined surface 52 is inclined rightward with respect to a direction in which the lever arm 46 is rotated toward the second edge portion 63 of the elongated hole 61.

As illustrated in FIG. 7A, when the rib 47 is brought into contact with the first inclined surface 51, the lever arm 46 is urged with respect to the urging switching member 44 so as to rotate toward the first edge portion 62 of the elongated hole 61. As illustrated in FIG. 8B, when the rib 47 is brought into contact with the second inclined surface 52, the lever arm 46 is urged with respect to the urging switching member 44 so as to rotate toward the second edge portion 63 of the elongated hole 61.

As illustrated in FIGS. 4, 7A, and 7B, the first edge portion 62 of the elongated hole 61 has a second engagement surface 65 (as one example of a guide and a first guide surface) and a third engagement surface 66 (as another example of the guide and the first guide surface) formed continuously to each other so as to extend rightward from a first engagement surface 64 of the elongated hole 61 which is a left end of the elongated hole 61.

The second engagement surface 65 and the third engagement surface 66 protrude from the first edge portion 62 toward the second edge portion 63. That is, the second engagement surface 65 and the third engagement surface 66 protrude rearward from the first edge portion 62. This protrusion of each of the second engagement surface 65 and the third engagement surface 66 is capable of positioning the lever arm 46 urged leftward, against the urging force of the second spring 59. Each of the second engagement surface 65 and the third engagement surface 66 has an inclined surface. The inclined surface is inclined such that its right portion is located on a rear side of its left portion in the front and rear direction. When the lever arm 46 is slid rightward, the lever arm 46 is guided by the inclined surfaces to move over the second engagement surface 65 and the third engagement surface 66.

Each of the first engagement surface 64, the second engagement surface 65, and the third engagement surface 66 positions the lever arm 46 at a position corresponding to the sliding position of the switch gear 41. That is, each of the first engagement surface 64, the second engagement surface 65, and the third engagement surface 66 positions the lever arm 46 to one of a plurality of positions which corresponds to the sliding position of the switch gear 41.

When the lever arm 46 is positioned by the first engagement surface 64, the switch gear 41 is engaged with the transmission gear 54. When the lever arm 46 is positioned by the second engagement surface 65, the switch gear 41 is engaged with the transmission gear 55. When the lever arm 46 is positioned by the third engagement surface 66, the switch gear 41 is engaged with the transmission gear 56.

As illustrated in FIG. 4, the first edge portion 62 has an inclined surface 67 (as yet another example of the guide and the first guide surface) located to the right of the third engagement surface 66. The inclined surface 67 is inclined such that its right portion is located on a rear side of its left portion in the front and rear direction.

The lever arm 46 slid rightward along the first edge portion 62 is guided rearward by the inclined surface 67 while contacting the inclined surface 67. As a result, the lever arm 46 pivots from a state indicated by the solid line in FIG. 6 in a direction indicated by arrow 105.

As illustrated in FIGS. 4, 7A, and 7B, a guide surface 90 (as one example of a guide and a second guide surface) is formed on the second edge portion 63 of the elongated hole 61 at a position opposed to the inclined surface 67. The guide surface 90 is an inclined surface inclined from a right end of the second edge portion 63 such that its left portion is located on a front side of its right portion in the front and rear direction.

A right end portion of the guide surface 90 extends to a position located at a rear of the carriage moving path 17. A left end portion of the guide surface 90 extends in the conveying direction 16 to a position in the carriage moving path 17.

A third inclined surface 68 (as another example of the guide and the second guide surface) is formed on the second edge portion 63 of the elongated hole 61 at a position opposed to the first engagement surface 64. The third inclined surface 68 is an inclined surface inclined such that its left portion is located on a front side of its right portion in the front and rear direction. The lever arm 46 slid leftward along the second edge portion 63 is guided frontward by the third inclined surface 68.

Switching of Driving by Drive Switching Mechanism 40

There will be next explained switching of power transmission to each of the transmission gears 54, 55, 56 by sliding of the switch gear 41.

As illustrated in FIG. 7A, when the lever arm 46 is positioned by the first engagement surface 64 of the lever guide 60, the rib 47 of the lever member 43 is in contact with the first inclined surface 51 of the urging switching member 44. The lever member 43 and the urging switching member 44 are urged by the first spring 58 and the second spring 59 so as to be in contact with each other. Thus, the rib 47 is guided along the first inclined surface 51. As a result, the lever arm 46 is urged in a direction directed from the second edge portion 63 toward the first edge portion 62 of the lever guide 60. That is, the urging switching member 44 urges the lever member 43 in the direction directed from the second edge portion 63 toward the first edge portion 62. As a result, the lever arm 46 is kept positioned by the first engagement surface 64. At this position of the lever member 43, the switch gear 41 is positioned so as to be engaged with the transmission gear 54.

When the guide piece 38 of the carriage 138 is moved rightward by contacting the lever arm 46 in the state illustrated in FIG. 7A, the lever arm 46 is moved from the first engagement surface 64 to the second engagement surface 65. The urging switching member 44 is pushed by the lever arm 46 and moved rightward. The rightward movement of the lever arm 46 causes the switch gear 41 to be moved rightward, following the lever arm 46, by the urging force of the first spring 58.

As illustrated in FIG. 7B, when the lever arm 46 is positioned by the second engagement surface 65, the rib 47 of the lever member 43 is in contact with the first inclined surface 51 of the urging switching member 44. The lever member 43 and the urging switching member 44 are urged by the first spring 58 and the second spring 59 so as to be in contact with each other. Thus, the rib 47 is guided along the first inclined surface 51. As a result, the lever arm 46 is urged toward the first edge portion 62 of the lever guide 60. Accordingly, the lever arm 46 is kept positioned by the second engagement surface 65.

When the guide piece 38 of the carriage 138 is moved rightward by contacting the lever arm 46 in the state illustrated in FIG. 7B, the lever arm 46 is moved from the second engagement surface 65 to the third engagement surface 66. The urging switching member 44 is pushed by the lever arm 46 and moved rightward. The rightward movement of the lever arm 46 causes the switch gear 41 to be moved rightward, following the lever arm 46, by the urging force of the first spring 58.

Figure 8A:
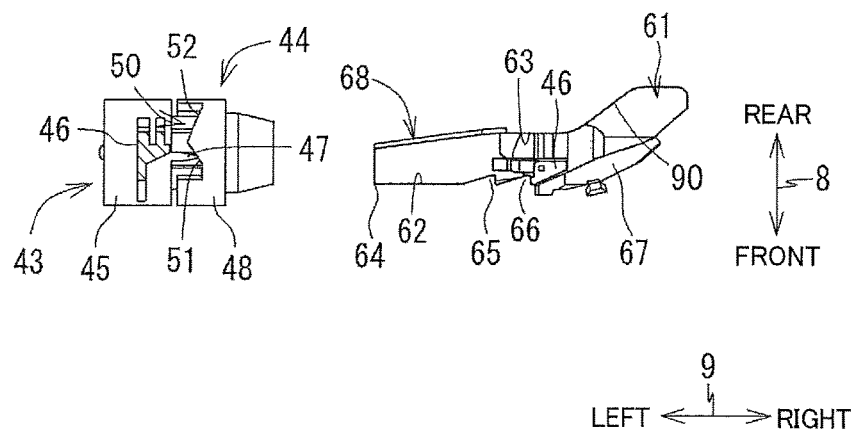
FIGS. 8A and 8B are views each illustrating an operation of the drive switching mechanism.
Figure 8B:
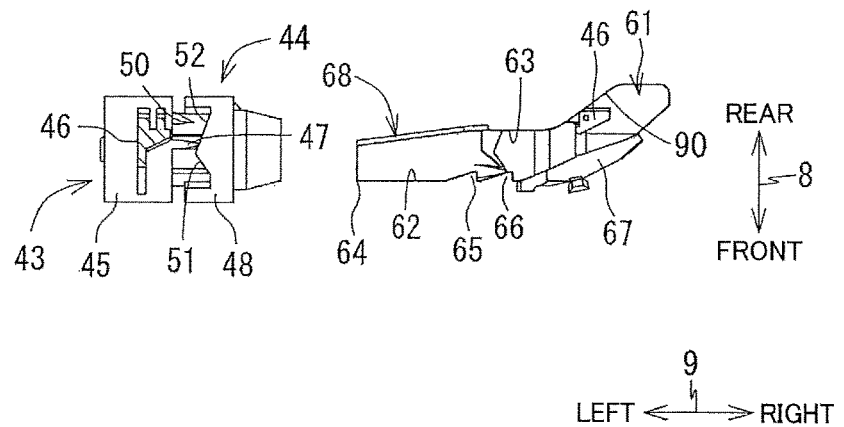

As illustrated in FIG. 8A, when the lever arm 46 is positioned by the third engagement surface 66, the rib 47 of the lever member 43 is in contact with the first inclined surface 51 of the urging switching member 44. The lever member 43 and the urging switching member 44 are urged by the first spring 58 and the second spring 59 so as to be in contact with each other. Thus, the rib 47 is guided along the first inclined surface 51. As a result, the lever arm 46 is urged toward the first edge portion 62 of the lever guide 60. Accordingly, the lever arm 46 is kept positioned by the third engagement surface 66.

When the guide piece 38 of the carriage 138 is moved rightward from the position illustrated in FIG. 8A by contacting the lever arm 46, the lever arm 46 is further moved rightward from the third engagement surface 66. The urging switching member 44 is pushed by the lever arm 46 and moved rightward. The rightward movement of the lever arm 46 causes the switch gear 41 to be moved rightward, following the lever arm 46, by the urging force of the first spring 58.

In a process in which the lever arm 46 is moved rightward from the third engagement surface 66, the lever arm 46 is moved along the inclined surface 67 of the lever guide 60. The lever arm 46 guided along the inclined surface 67 is moved rightward and pivots rearward.

This pivotal movement rotates the lever member 43 and the urging switching member 44 relative to each other about the shaft 42 respectively in reverse directions. As a result, the rib 47 of the lever member 43 is moved from a position at which the rib 47 contacts the first inclined surface 51 of the urging switching member 44, to a position at which the rib 47 contacts the second inclined surface 52 of the urging switching member 44. The lever member 43 and the urging switching member 44 are urged by the first spring 58 and the second spring 59 so as to be in contact with each other. Thus, the rib 47 is guided along the second inclined surface 52. Consequently, the lever arm 46 is urged in a direction directed from the first edge portion 62 of the lever guide 60 toward the second edge portion 63. As a result, as illustrated in FIG. 8B, the lever arm 46 is in contact with the guide surface 90.

That is, when the lever member 43 is slid in the right and left direction 9, the urging switching member 44 acts on the lever arm 46 guided along the inclined surface 67, whereby a direction in which the lever arm 46 is urged is switched from the direction directed from the second edge portion 63 toward the first edge portion 62, to a direction directed from the first edge portion 62 toward the second edge portion 63.

Figure 9A:
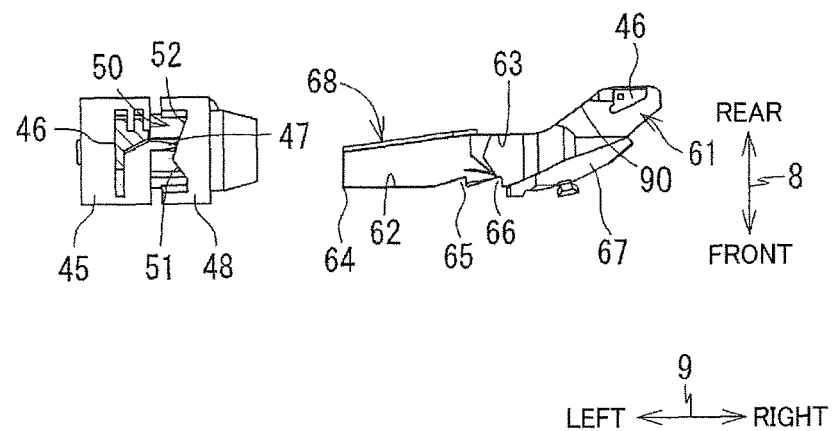
FIGS. 9A and 9B are views each illustrating an operation of the drive switching mechanism.

When the carriage 138 is further moved rightward from the position illustrated in FIG. 8B, the lever arm 46 urged toward the second edge portion 63 is moved rightward along the guide surface 90 opposed to the inclined surface 67. In this movement, the lever arm 46 is moved rearward in addition to the right direction. When the lever arm 46 is moved to a position located to the right of the guide surface 90, as illustrated in FIG. 9A, the lever arm 46 is located at a rear of the carriage 138. As a result, the lever arm 46 is not pushed rightward by the carriage 138. In this state, frontward pivotal movement of the lever arm 46 is inhibited by a rear surface 39 of the guide piece 38. Thus, the lever arm 46 cannot be moved leftward along the guide surface 90.

When the carriage 138 is moved leftward from a position illustrated in FIG. 9A, the guide piece 38 is moved off the lever arm 46. This separation of the guide piece 38 causes the lever arm 46 to be urged leftward by the second spring 59. As a result, the lever arm 46 is slid leftward along the guide surface 90. The urging switching member 44 and the switch gear 41 are also urged by the second spring 59 and moved leftward.

Figure 9B:
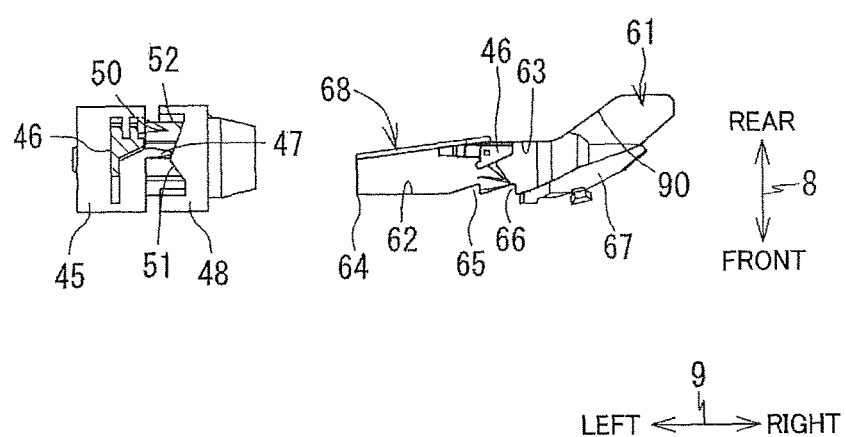

In a process in which the lever arm 46 is moved leftward along the second edge portion 63 as illustrated in FIG. 9B, the lever arm 46 is moved along the third inclined surface 68 of the second edge portion 63. This movement rotates the lever member 43 and the urging switching member 44 relative to each other about the shaft 42 respectively in reverse directions. As a result, the rib 47 of the lever member 43 is moved from the position at which the rib 47 contacts the second inclined surface 52 of the urging switching member 44, to the position at which the rib 47 contacts the first inclined surface 51 of the urging switching member 44. The lever member 43 and the urging switching member 44 are urged by the first spring 58 and the second spring 59 so as to be in contact with each other. Thus, the rib 47 is guided along the first inclined surface 51. Consequently, the lever arm 46 is urged toward the first edge portion 62 of the lever guide 60. As a result, as illustrated in FIG. 7A, the lever arm 46 is positioned by the first engagement surface 64 of the lever guide 60.

Maintenance Mechanism 151

As illustrated in FIG. 2, the printer 10 includes a maintenance mechanism 151 (as one example of a second load applier). The maintenance mechanism 151 is located to the right of the drive switching mechanism 40 in the carriage moving path 17.

Figure 10:
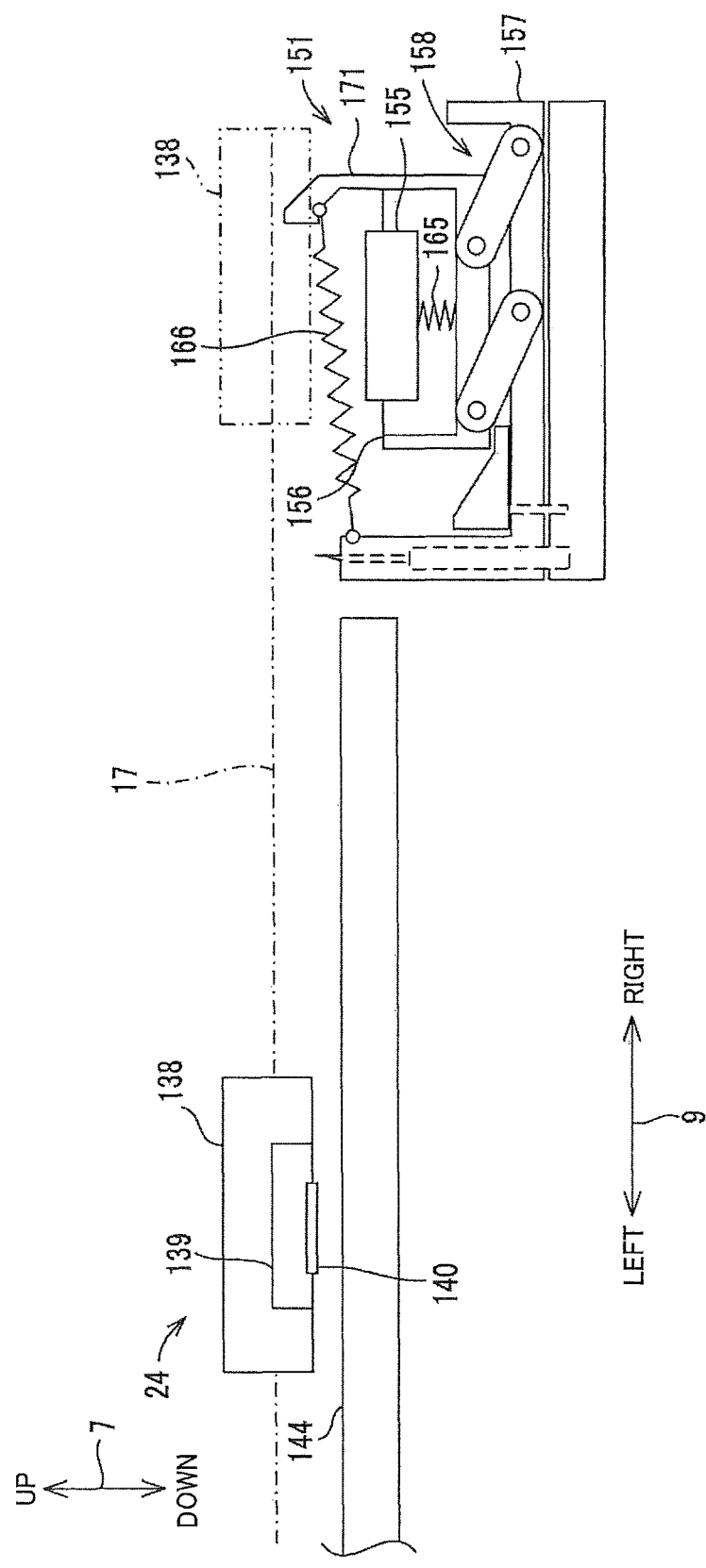
FIG. 10 is a schematic side view illustrating a construction of a maintenance mechanism.

As illustrated in FIG. 10, the maintenance mechanism 151 includes a cap 155, a first frame 156, a second frame 157, a parallel link 158, a cap lever 171, and a coil spring 166.

The cap 155 covers the nozzles 140 of the recording head 139 when the carriage 138 is moved to a capping position P1 that is set just above the maintenance mechanism 151. The cap 155 is supported resiliently in the up and down direction via a coil spring 165 provided between a lower portion of the cap 155 and a bottom surface of the first frame 156.

The first frame 156 is provided on the second frame 157. The second frame 157 is shaped like a box having a bottom surface. The first frame 156 is mounted on a bottom surface of the second frame 157 via the parallel link 158.

The parallel link 158 couples the first frame 156 and the second frame 157 to each other in the up and down direction 7. The parallel link 158 is configured to move the first frame 156 relative to the second frame 157 in the up and down direction 7. Thus, the cap 155 resiliently supported by the first frame 156 is movable, by an operation of the parallel link 158, between a cap position and a wait position located under the cap position. When the cap 155 is located at the cap position, the cap 155 covers the nozzles 140 of the recording head 139. When the cap 155 is located at the wait position, the cap 155 is located under and spaced apart from the nozzles 140.

The cap lever 171 is fixed to the first frame 156. The cap lever 171 is located to the right of the first frame 156. The cap lever 171 extends to the carriage moving path 17.

The coil spring 166 (as one example of a second urging member) is hung between the cap lever 171 and the second frame 157. The coil spring 166 has a natural length when the first frame 156 is located at its lower position, and the cap 155 is located at the wait position. The coil spring 166 is extended when the first frame 156 is located at its upper position, and the cap 155 is located at the cap position. That is, when the cap 155 is located at the cap position, the first frame 156 is urged downward so as to move the cap 155 back to the wait position.

When the carriage 138 is moved toward the maintenance mechanism 151, and thereby the guide piece 38 of the carriage 138 is brought into contact with the cap lever 171, the cap lever 171 receives a rightward pressing force. This pressing force raises the first frame 156 against the resilient force of the coil spring 166. When the carriage 138 is moved to the capping position P1, the first frame 156 is moved upward, and the cap 155 reaches the cap position. When the carriage 138 is moved leftward from the capping position P1, on the other hand, the first frame 156 is moved downward, and the cap 155 reaches the wait position.

Load Schematic View

Figure 11:
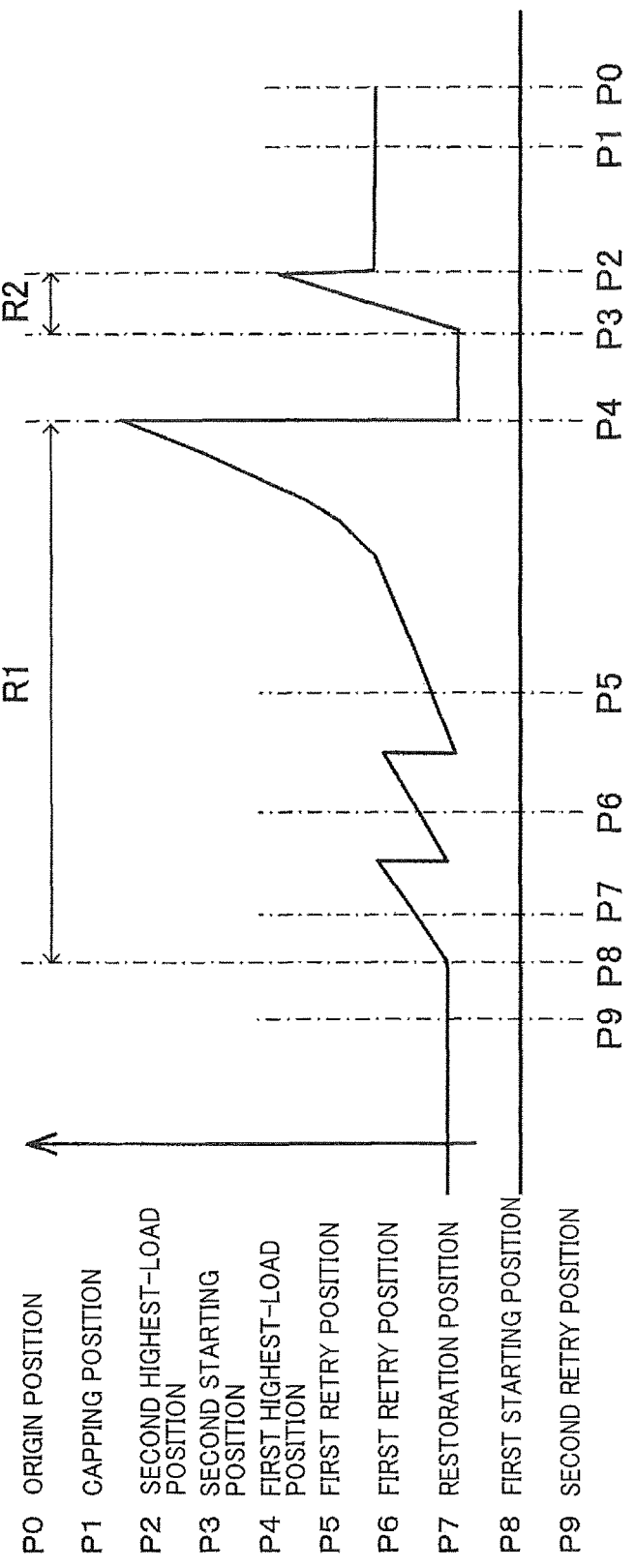
FIG. 11 is a schematic view illustrating a relationship between a position of the carriage and a load imposed on the carriage.
Figure 12:
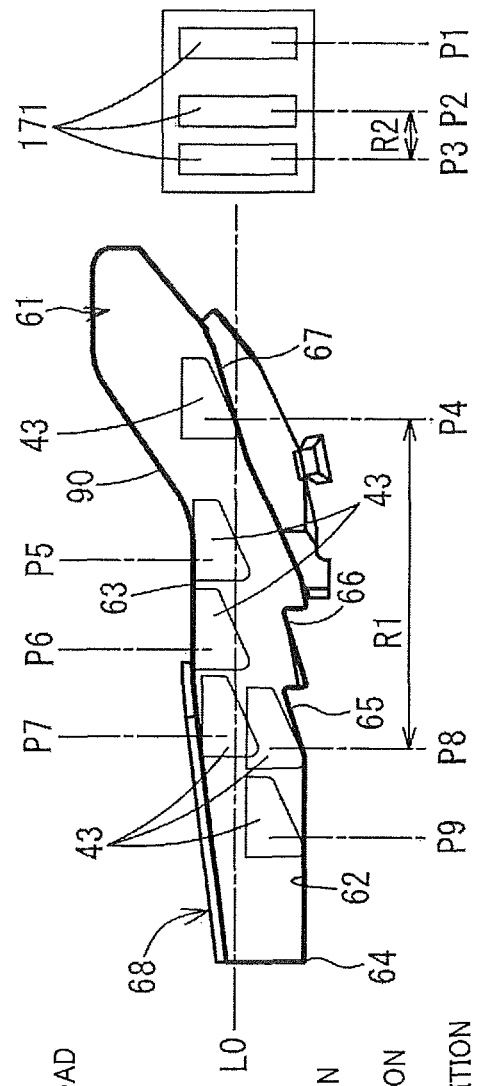
FIG. 12 is a plan view illustrating correspondence between a position of the carriage and positions of the lever member and a cap lever.

There will be next explained a relationship between a position of the carriage 138 and a load imposed on the carriage 138 with reference to FIGS. 11 and 12. The horizontal axis in FIG. 11 indicates a distance from the origin position P0 in the carriage moving path 17. The vertical axis in FIG. 11 indicates a magnitude of the load imposed on the carriage 138. FIG. 12 represents a relationship between the position of the carriage 138 and positions of the lever member 43 and the cap lever 171. The neutral line L0 in FIG. 12 indicates an imaginary line extending in the right and left direction 9 when the lever member 43 is located at the neutral position PR0.

As illustrated in FIG. 11, the following positions are located on the carriage moving path 17: the capping position P1 (as one example of a target position), a second highest-load position P2, a second starting position P3 (as one example of an upstream end position), a first highest-load position P4, a first retry position P5, a first retry position P6, a restoration position P7, a first starting position P8, and a second retry position P9 arranged in this order from the origin position P0 in the left direction (as one example of the second direction).

The capping position P1, the second highest-load position P2, the second starting position P3, the first highest-load position P4, and the restoration position P7 are positions specific to the printer 10 due to the construction of the printer 10. The origin position P0, the first retry position P5, the first retry position P6, and the second retry position P9 are positions set by the controller 130. The controller 130 stores a distance from the origin position P0 to each of the positions P1-P9, in the EEPROM 134 (see FIG. 3), as the counted number of pulses output from the linear encoder 174. As described above, the counted number of the pulses output from the linear encoder 174 is a value stored in the RAM 133 and increased or reduced with movement of the carriage 138 toward or away from the origin position P0.

First Load Region R1

As illustrated in FIGS. 11 and 12, a first load region R1 extending from the first starting position P8 to the first highest-load position P4 is a region on which the carriage 138 receives a first load from the drive switching mechanism 40 when the carriage 138 is moved rightward (as one example of the first direction).

The first load includes: a base load generated by an urging force in the axial direction of the shaft 42; and a peak load generated by an urging force in the rotational direction of the shaft 42. The base load is imposed on the carriage 138 when the lever member 43 is pushed by the carriage 138 along the carriage moving path 17. The peak load is imposed on the carriage 138 when the lever member 43 pivots in the rotational direction of the shaft 42 and moves over the neutral position PR0. The peak load changes considerably when compared with the base load. The first highest-load position P4 is a position at which the peak load is the highest among the positions P0-P9. Thus, the first load as the sum of the peak load and the base load is also the highest at the first highest-load position P4.

As illustrated in FIG. 11, the first starting position P8 is a start end position (a left end position) of the first load region R1. In the present embodiment, as illustrated in FIG. 12, the first starting position P8 is a position of the carriage 138 when the lever member 43 pushed by the carriage 138 is located at a left end of the second engagement surface 65. As illustrated in FIG. 11, the first load is the highest at the first highest-load position P4. Since the peak load is attenuated or disappears on a right side of the first highest-load position P4, the first highest-load position P4 is also a terminal end position (a right end position) of the first load region R1. In the present embodiment, as illustrated in FIG. 12, the first highest-load position P4 is a position of the carriage 138 when the lever member 43 is pivoted over the neutral position PR0 (see FIG. 6) by movement of the rib 47 from the first inclined surface 51 to the second inclined surface 52 (see FIG. 8) when the lever member 43 pushed by the carriage 138 is moved along the inclined surface 67.

Second Load Region R2

As illustrated in FIGS. 11 and 12, a second load region R2 extending from the second starting position P3 to the second highest-load position P2 is a region on which the carriage 138 receives a second load from the maintenance mechanism 151 when the carriage 138 is moved rightward. The second load region R2 is located to the right of the first load region R1.

As illustrated in FIG. 11, the second starting position P3 is a start end position (a left end position) of the second load region R2. In the present embodiment, as illustrated in FIG. 12, the second starting position P3 is a position of the carriage 138 when the carriage 138 moved rightward is brought into contact with the cap lever 171 (see FIG. 10) of the maintenance mechanism 151. As illustrated in FIG. 11, the second highest-load position P2 is a terminal end position (a right end position) of the second load region R2, and the second load is the highest at this second highest-load position P2. In the present embodiment, as illustrated in FIG. 12, the second highest-load position P2 is a position of the carriage 138 when the urging force received by the cap lever 171 from the coil spring 166 of the maintenance mechanism 151 is the largest while the cap lever 171 is being pushed rightward by the carriage 138

Capping Position P1

As illustrated in FIGS. 11 and 12, the capping position P1 is a position of the carriage 138 when the nozzles 140 are covered with the cap 155 that has moved to the cap position by the cap lever 171 being pushed rightward by the carriage 138.

Restoration Position P7

As illustrated in FIG. 11, the restoration position P7 is a position of the carriage 138 when the peak load having disappeared by movement of the carriage 138 to a position located to the right of the first highest-load position P4 is restored by leftward movement of the carriage 138. In the present embodiment, as illustrated in FIG. 12, the restoration position P7 is a position of the carriage 138 when the lever member 43 is pivoted over the neutral position PR0 (see FIG. 6) by movement of the rib 47 from the second inclined surface 52 to the first inclined surface 51 when the lever member 43 moved leftward by the urging force of the second spring 59 is moved along the third inclined surface 68 (see FIG. 9). Here, when the carriage 138 is moved leftward, the lever member 43 is moved leftward by the urging force of the second spring 59.

When the carriage 138 is moved leftward to a position located to the left of the restoration position P7, the rib 47 is brought into contact with the first inclined surface 51. Thus, when the carriage 138 is moved rightward again from the position located to the left of the restoration position P7 and then is located at the first highest-load position P4, the peak load having temporarily disappeared is restored. That is, the state in which the carriage 138 is moved to and located at the position located to the left of the restoration position P7 is a state in which the lever member 43 is located at its front position by having moved over the neutral line L0 in FIG. 12. When the carriage 138 is then moved rightward again, the peak load is imposed on the carriage 138. As long as the carriage 138 remains at a position located to the right of the restoration position P7, the state in which the peak load disappears is kept. Accordingly, the peak load is not imposed on the carriage 138 even when the carriage 138 is moved rightward again.

Moving Processing and Retry Processing

The controller 130 is configured to execute a moving processing and a retry processing. In the moving processing, the carriage 138 is moved from a position located to the left of the first load region R1, toward the capping position P1 located to the right of the second load region R2. In the retry processing, the carriage 138 is moved to the capping position P1 again when the controller 130 in the moving processing detects that the carriage 138 is stopped, and the stop position of the carriage 138 is different from the capping position P1.

As the retry processing, the controller 130 is capable of executing (i) a processing for moving the carriage 138 straight to the capping position P1 without return and (ii) a processing for moving the carriage 138 rightward toward the capping position P1 after temporarily moving the carriage 138 leftward. When temporarily moving the carriage 138 leftward, the controller 130 moves the carriage 138 leftward to any of the first retry position P5, the first retry position P6, and the second retry position P9, as the target position. When temporarily moving the carriage 138 leftward, the controller 130 selects any of the first retry position P5, the first retry position P6, and the second retry position P9, as a retry position, in accordance with the stop position of the carriage 138 as will be described below. The first retry position P5 and the first retry position P6 are set between the restoration position P7 and the first highest-load position P4.

The second retry position P9 is set at a position located to the left of the first load region R1.

When the carriage 138 is moved to the target position in the moving processing and the retry processing, the controller 130 creates a drive signal for driving the carriage drive motor 173, based on a distance from the current stop position to the target position. Here, the target position is the capping position P1 or the first retry position P5, for example. The controller 130 is capable of detecting a distance from the origin position P0 to the current stop position, based on the counted number of the output pulses which is stored in the RAM 133. A distance from the origin position P0 to the target position is stored in the ROM 132. This configuration enables the controller 130 to determine a distance from the current stop position to the target position. The controller 130 creates a drive signal for rotating the carriage drive motor 173 by the number of rotations which corresponds to the distance to the target position and transmits this drive signal to the carriage drive motor 173.

Control Flow

Figure 13:
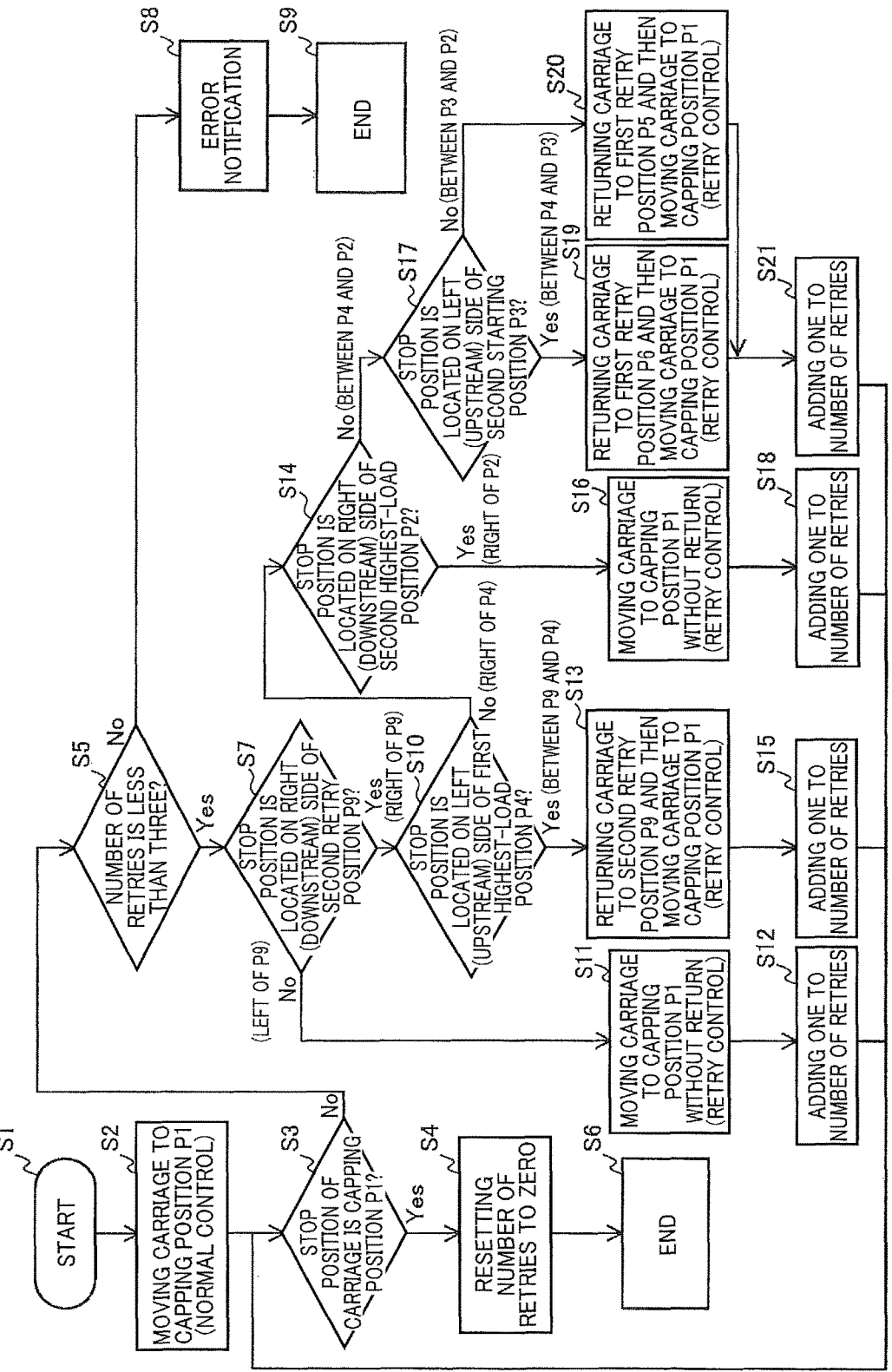
FIG. 13 is a flow chart illustrating a carriage moving processing and a retry processing.

There will be next explained a control flow of the moving processing and the retry processing with reference to FIG. 13.

To move the carriage 138 to the capping position P1, the controller 130 starts the control flow in FIG. 13 at S1 at a particular timing, for example, a timing at which a print processing is finished. After execution of the processing at S1, the controller 130 creates the drive signal for moving the carriage 138 from the current stop position to the capping position P1 and outputs the drive signal to the carriage drive motor 173. As a result, the carriage 138 is at S2 moved rightward toward the capping position P1. After the execution of the processing at S2, the controller 130 determines whether the carriage 138 is at rest. The controller 130 determines that the carriage 138 is at rest, when no pulse signals are output from the linear encoder 174 in a particular period. When the controller 130 determines that the carriage 138 is at rest, the controller 130 at S3 determines whether the stop position of the carriage 138 is the capping position P1. The controller 130 determines that the stop position of the carriage 138 is the capping position P1, when the controller 130 compares the number of the output pulses of the linear encoder 174 at the stop position of the carriage 138 with the number of the output pulses at the capping position P1 which is read from the EEPROM 134 and when these numbers are equal to each other or a difference between these numbers is within a particular range. When the controller 130 determines that the stop position is the capping position P1 (S3: Yes), the controller 130 at S4 resets the number of retries which is stored in the RAM 133, and this control flow ends at S9.

When the controller 130 determines that the stop position of the carriage 138 is not the capping position P1 (S3: No), the controller 130 at S5 determines whether the number of retries which is stored in the RAM 133 is less than three. When the controller 130 determines that the number of retries is not less than three (S5: No), the controller 130 at S8 performs error notification, that is, the controller 130 controls the display 175 (see FIG. 3) to display an image prompting a user to instruct maintenance. For example, the controller 130 controls the display 175 to display a message "Perform Carriage Maintenance". After the execution of the processing at S8, this control flow ends at S9.

When the controller 130 determines that the number of retries is less than three (S5: Yes), the controller 130 at S7 determines whether the stop position of the carriage 138 is located to the right of the second retry position P9. This determination is executed in the same manner as that of the processing at S3. When the controller 130 determines that the stop position is not located to the right of the second retry position P9 (S7: No), the controller 130 at S11 moves the carriage 138 toward the capping position P1 again as the retry processing without moving back the carriage 138 leftward. This moving processing is executed in the same manner as that of the processing at S2. When the stop position is not located to the right of the second retry position P9, as illustrated in FIGS. 11 and 12, the carriage 138 is not in contact with the lever member 43, and any of the first load and the second load is not imposed on the carriage 138. In this state, there is no need to return the carriage 138 leftward once in the retry processing to accelerate the carriage 138. After the execution of the processing at S11, the controller 130 at S12 adds one to the number of retries which is stored in the RAM 133, and this flow returns to S3.

When the controller 130 determines that the stop position is located to the right of the second retry position P9 (S7: Yes), the controller 130 at S10 determines whether the stop position of the carriage 138 is located to the left of the first highest-load position P4. This determination is executed in the same manner as that of the processing at S3.

When the controller 130 determines that the stop position is located to the left of the first highest-load position P4 (S10: Yes), the controller 130 at S13 as the retry processing moves the carriage 138 leftward to the second retry position P9 and then moves the carriage 138 rightward toward the capping position P1. This moving processing is executed in the same manner as that of the processing at S2. When the stop position of the carriage 138 is located to the right of the second retry position P9 and to the left of the first highest-load position P4, as illustrated in FIGS. 11 and 12, the lever member 43 is located between the positions P9, P4 located nearer to the first edge portion 62 of the lever guide 60 than to the second edge portion 63. That is, the carriage 138 is at rest in the first load region R1 before passing through the first highest-load position P4. When the carriage 138 is moved leftward to the second retry position P9 in this state, the lever member 43 is moved leftward along the first edge portion 62 of the lever guide 60. After the execution of the processing at S13, the controller 130 at S15 adds one to the number of retries which is stored in the RAM 133, and this flow returns to S3.

When the controller 130 determines that the stop position of the carriage 138 is located to the left of the first highest-load position P4 (S10: No), the controller 130 at S14 determines whether the stop position of the carriage 138 is located to the right of the second highest-load position P2. This determination is executed in the same manner as that of the processing at S3. When the controller 130 determines that the stop position of the carriage 138 is located to the right of the second highest-load position P2 (S14: Yes), the controller 130 at S16 as the retry processing moves the carriage 138 toward the capping position P1 without moving the carriage 138 leftward. This moving processing is executed in the same manner as that of the processing at S2. When the stop position is located to the right of the second highest-load position P2, as illustrated in FIGS. 11 and 12, the carriage 138 has brought into contact with the lever member 43 and already passed through the first load region R1 and the second load region R2. In this state, there is no need to return the carriage 138 leftward once in the retry processing to accelerate the carriage 138. After the execution of the processing at S16, the controller 130 at S18 adds one to the number of retries which is stored in the RAM 133, and this flow returns to S3.

When the controller 130 determines that the stop position of the carriage 138 is located to the right of the second highest-load position P2 (S14: No), the controller 130 at S17 determines whether the stop position of the carriage 138 is located to the left of the second starting position P3. When the controller 130 determines that the stop position is located to the left of the second starting position P3 (S17: Yes), the controller 130 at S19 as the retry processing moves the carriage 138 leftward toward the first retry position P6 and then moves the carriage 138 toward the capping position P1. This moving processing is executed in the same manner as that of the processing at S2. When the stop position of the carriage 138 is located to the right of the first highest-load position P4 and to the left of the second starting position P3, as illustrated in FIGS. 11 and 12, the lever member 43 is located to the right of the position P4 located nearer to the second edge portion 63 of the lever guide 60 than to the first edge portion 62. That is, the carriage 138 is moved through the first load region R1 and stopped before reaching the second load region R2. When the carriage 138 is moved leftward to the first retry position P6 in this state, the lever member 43 is moved leftward along the second edge portion 63 of the lever guide 60. It is noted that since the first retry position P6 is located to the right of the restoration position P7, the lever member 43 is not moved in this retry processing from the second edge portion 63 to the first edge portion 62. After the execution of the processing at S19, the controller 130 at S21 adds one to the number of retries which is stored in the RAM 133, and this flow returns to S3.

When the controller 130 determines that the stop position is not located to the left of the second starting position P3 (S17: No), the controller 130 at S20 as the retry processing moves the carriage 138 leftward toward the first retry position P5 and then moves the carriage 138 toward the capping position P1. This moving processing is executed in the same manner as that of the processing at S2. When the stop position of the carriage 138 is located to the left of the second highest-load position P2 and to the right of the second starting position P3, as illustrated in FIGS. 11 and 12, the lever member 43 is located to the right of the position P4 located nearer to the second edge portion 63 of the lever guide 60 than to the first edge portion 62. That is, the carriage 138 passes through the first load region R1, reaches the second load region R2, and is at rest before passing through the second highest-load position P2. When the carriage 138 is moved leftward to the first retry position P5 in this state, the lever member 43 is moved leftward along the second edge portion 63 of the lever guide 60. It is noted that since the first retry position P5 is located to the right of the restoration position P7, the lever member 43 is not moved in this retry processing from the second edge portion 63 to the first edge portion 62.

Since the first retry position P6 is located to the left of the first retry position P5, it is possible to produce greater than or equal to a specific amount of an approach distance required to accelerate the carriage 138 in accordance with the stop position of the carriage 138. After the execution of the processing at S20, the controller 130 at S21 adds one to the number of retries which is stored in the RAM 133, and this flow returns to S3.

Effects in First Embodiment

In the printer 10 according to the first embodiment, when the controller 130 determines that the stop position of the carriage 138 is located between the first highest-load position P4 and the second highest-load position P2, the controller 130 moves the carriage 138 leftward to the first retry position P5 or P6 set between the restoration position P7 and the first highest-load position P4. Here, the case where the stop position of the carriage 138 is located between the first highest-load position P4 and the second highest-load position P2 is a case where the carriage 138 is moved over the peak load of the first load but stopped by the second load. The restoration position P7 is a position at which the carriage 138 returned rightward and then moved toward the capping position P1 again in the retry processing does not re-receive the peak load, over which the carriage 138 had been moved. That is, in the case where the carriage 138 is moved over the peak load but stopped by the second load, the carriage 138 need not be moved over the moved-over peak load again in the retry processing. Accordingly, the printer 10 can execute the retry processing, depending upon the load generation source.

The first retry positions P5, P6 are located to the left of the first highest-load position P4, it is possible to reliably produce an approach distance by moving the carriage 138 leftward in the retry processing without the carriage 138 again moving over the peak load over which the carriage 138 is moved once. This improves a success rate of the retry processing.

The first retry positions P5, P6 are not fixed but are variable, making it possible to change the approach distance in the retry processing, depending upon the stop position.

The first retry positions P5, P6 are set at more rightward positions when the stop position is located at a position located to the right of a certain position than when the stop position is located at the certain position. This configuration reliably produces the approach distance in the retry processing regardless of the stop position.

In the case where the controller 130 determines that the stop position of the carriage 138 is located to the right of the second highest-load position P2 in the retry processing, that is, in the case where the carriage 138 is stopped after moving over both of the peak load of the first load and the second load, the controller 130 moves the carriage 138 to the capping position P1 without returning the carriage 138 for approach movement. In the case where there is no possibility that the carriage 138 receives a load generated by its movement, the controller 130 moves the carriage 138 to the capping position P1 without returning the carriage 138. Thus, the printer 10 can execute the retry processing, depending upon the load generation source.

In the case where the controller 130 determines that the stop position of the carriage 138 is located between the second retry position P9 and the first highest-load position P4 in the retry processing, the carriage 138 is returned to the second retry position P9. This operation reliably produces the approach distance in the retry processing.

When the controller 130 determines that the number of executions of the retry processing has reached a particular number, and the stop position is different from the target position, the user is notified of an error occurrence. This configuration prevents endless execution of the retry processing when the carriage 138 cannot reach the capping position P1.

Second Embodiment

Figure 14:
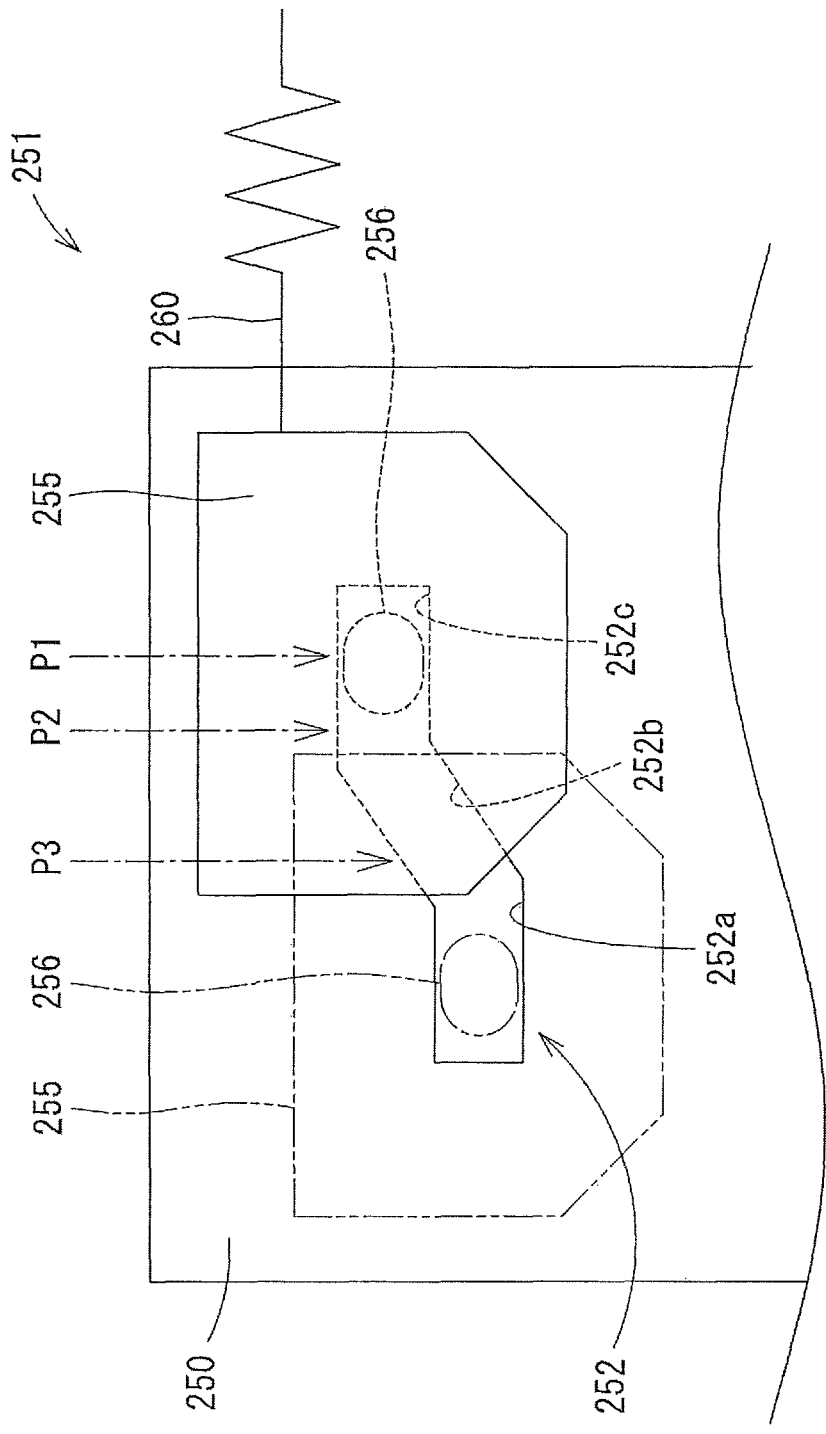
FIG. 14 is a schematic side view illustrating a construction of a maintenance mechanism in a second embodiment.

There will be next explained the printer 10 according to a second embodiment with reference to FIGS. 4 and 14. The printer 10 according to the second embodiment includes a maintenance mechanism 251 different from the maintenance mechanism 151 according to the first embodiment. The other construction in the second embodiment is the same as that in the first embodiment, and an explanation of which is dispensed with.

As illustrated in FIGS. 4 and 14, the maintenance mechanism 251 (as another example of the second load applier) includes: a cap 255 contactable with the carriage 138; a guide frame 250; and a spring 260. The guide frame 250 has a guide hole 252 for guiding movement of the cap 255. The cap 255 has an engaging portion 256 that is to be inserted into the guide hole 252. The guide hole 252 includes: a lower portion 252a extending rightward from a left end portion of the guide hole 252; an inclined portion 252b inclined from the lower portion 252a in an upper right direction; and an upper portion 252c extending rightward from the inclined portion 252b. The engaging portion 256 of the cap 255 is movable between (i) a wait position at which the engaging portion 256 is located in the lower portion 252a and (ii) a cap position at which the engaging portion 256 is located at a right end of the upper portion 252c. When the cap 255 is not in contact with the carriage 138, the cap 255 is urged leftward by the spring 260, and the cap 255 is located at the wait position on the lower portion 252a.

As illustrated in FIG. 14, when the carriage 138 is in contact with the cap 255, and the engaging portion 256 of the cap 255 is located at a boundary position between the lower portion 252a and the inclined portion 252b, the carriage 138 is located at the second starting position P3. When the engaging portion of the cap 255 pushed by the carriage 138 is located at a boundary position between the inclined portion 252b and the upper portion 252c, the carriage 138 is located at the second highest-load position P2. When the engaging portion 256 of the cap 255 pushed by the carriage 138 is located at the right end of the upper portion 252c, the carriage 138 is located at the capping position P1. When the engaging portion 256 contacted by the carriage 138 finishes climbing the inclined portion 252b, the second load is the highest.

Third Embodiment

There will be next explained the printer 10 according to a third embodiment. The controller 130 according to the third embodiment is capable of executing an obtaining processing for obtaining and updating positions relating to the moving processing and the retry processing. The other construction in the third embodiment is the same as that in the first embodiment, and an explanation of which is dispensed with.

Position Obtaining Processing

There will be next explained control for obtaining the positions P4, P2, P5, and P6 relating to the moving processing and the retry processing. Information on each of the positions P4, P2, P5, and P6 is a value of the number of the pulses output from the linear encoder 174 (see FIG. 2), which value represents a distance from the origin position P0 to a corresponding one of the positions P4, P2, P5, and P6. In the first embodiment, the number of the output pulses at each of the positions P4, P2, P5, and P6 is set as an initial value and stored in the EEPROM 134 of the controller 130 (see FIG. 3). In the third embodiment, the number of the output pulses at each of the positions P4, P2, P5, and P6 is newly obtainable by execution of the obtaining processing which will be explained in detail.

The controller 130 detects lowering of a speed of the carriage 138 based on the number of the pulses that are output from the linear encoder 174 during movement of the carriage 138. Here, the lowering of the speed of the carriage 138 indicates a case where the speed of the carriage 138 lowers even though the controller 130 does not lower a speed target value instructed to the carriage drive motor 173 (see FIG. 3). This lowering of the speed is caused when the carriage 138 actually receives a load from the carriage moving path 17. It is noted that this load may be hereinafter referred to as "actual load". The controller 130 determines (i) an area on which a load extends on the carriage moving path 17 and (ii) the highest value of the load, based on a position at which the speed is lowered and an amount of lowering of the speed.

The obtaining processing includes: a test moving processing for moving the carriage 138 as a test; a first obtaining processing for obtaining the first highest-load position P4 and the second highest-load position P2; and a second obtaining processing for obtaining the first retry positions P5, P6. In the test moving processing, the controller 130 moves the carriage 138 across the carriage moving path 17. Since a load on the carriage moving path 17 lowers the speed of the carriage 138, the controller 130 determines a position of the actual load based on (i) a position at which the speed of the carriage 138 is lowered and (ii) an amount of lowering of the speed. In the first obtaining processing, the controller 130 obtains the first highest-load position P4 and the second highest-load position P2 based on the position of the actual load which is detected in the test moving processing and stores the obtained first highest-load position P4 and second highest-load position P2 into the EEPROM 134. In the second obtaining processing, the controller 130 obtains the first retry positions P5, P6 based on the first highest-load position P4 and the second highest-load position P2.

The obtaining processing is executed in the case where there is a need to newly obtain the positions P4, P2, P5, and P6, for example, when the printer 10 is turned on for the first time after factory shipment of the printer 10. The positions P4, P2, P5, and P6 obtained by the obtaining processing are stored into the EEPROM 134 and used thereafter in the moving processing and the retry processing. The obtaining processing may be used to update the positions P4, P2, P5, and P6 stored in the EEPROM 134. For example, initial values of the positions P4, P2, P5, and P6 may be stored in the EEPROM 134 in factory shipment of the printer 10 and updated by execution of the obtaining processing. The obtaining processing for the update may be executed not only when the printer 10 is turned on after the factory shipment but also each time when a predetermined period is elapsed after the factory shipment.

In the above-described obtaining processing, the controller 130 determines the area on which the load extends on the carriage moving path 17 and the highest value of the load, based on the position at which the speed is lowered and the amount of lowering of the speed. However, the controller 130 may determine the area on which the load extends on the carriage moving path 17 and the highest value of the load, based on change in a PWM value input to the carriage drive motor 173. Here, the controller 130 executes target-value follow-up control for making the speed of the carriage 138 equal to a target speed set for the carriage drive motor 173. In the case where a load exists on the carriage moving path 17, the PWM value increases so as to compensate for a speed lowered due to the presence of the load. Thus, the controller 130 can determine the area on which the load extends on the carriage moving path 17 and the highest value of the load, based on change in the PWM value.

Effects in Third Embodiment

In the printer 10 according to the third embodiment, the first load region R1, the second load region R2, and the first retry positions P5, P6 are obtained based on the position and the magnitude of the actual load which are detected in the test moving processing. Since the controller 130 can execute the retry processing in accordance with a situation of the actual load, the controller 130 can efficiently execute the retry processing.

Modifications

The first load region R1 and the second load region R2 are provided on the right end portion of the carriage moving path 17 in the printers 10 according to the first to third embodiments but may be provided on a left end portion of the carriage moving path 17.

The first retry position P5 set when the stop position of the carriage 138 is located between the second starting position P3 and the second highest-load position P2, and the first retry position P6 set when the stop position of the carriage 138 is located between the first highest-load position P4 and the second starting position P3 are fixed values regardless of the stop position in the control flow in the first to third embodiments but may be values which are changed in accordance with the stop position. The controller 130 may make the distance from the stop position to the first retry position P5 longer than the distance from the stop position to the first retry position P6. In this case, a distance required for moving the carriage 138 to the second direction when the stop position is located at the second load region R2 is greater than a distance required for moving the carriage 138 to the second direction when the stop position is not located at the second load region R2, and accordingly a longer approach distance in the retry processing is achieved when the carriage 138 is stopped due to the second load.

While execution of the control flow is interrupted when the number of retries is greater than or equal to three in the control flow in the first to third embodiments, the number of retries for determining the interruption of the control flow may be two or four.

The error notification is a warning in the form of the image displayed on the display 175 in the printers 10 according to the first to third embodiments but may be a warning in the form of a voice output from a voice output device.

What is claimed is:
1. An image recording apparatus, comprising:
  a carriage supporting an image recorder;
  a driving member configured to move the carriage along a moving path;
  a detector configured to detect a position of the carriage in the moving path and presence or absence of a stop of the carriage;
  a first load applier configured to apply a first load to the carriage moving in a first direction, by contacting the carriage moving in the first direction in a first load region of the moving path;
  a second load applier configured to apply a second load, different from the first load, to the carriage moving in the first direction in a second load region located downstream of the first load region in the first direction in the moving path; and
  a controller configured to control the driving member, wherein a peak load that is a highest load applied to the carriage moving in the first direction in the first load region is highest at a first highest-load position of the first load region, and the peak load is restored at the first highest-load position when the carriage is moved to a position located downstream of the first highest-load position in the first direction, thereafter moved, in a second direction opposed to the first direction, over a restoration position located downstream of the first highest-load position in the second direction, and thereafter moved in the first direction again, wherein the second load is highest at a second highest-load position of the second load region, wherein the controller is configured to execute:
 a moving processing in which the controller moves the carriage from a position located upstream of the first load region in the first direction, toward a target position located downstream of the second load region in the first direction; and
 a retry processing in which the controller moves the carriage to the target position again when the detector detects a stop of the carriage in the moving processing, and a stop position of the carriage which is detected by the detector is different from the target position, and wherein in the retry processing, when the stop position of the carriage which is detected by the detector is located between the first highest-load position and the second highest-load position, the controller moves the carriage in the first direction toward the target position after moving the carriage from the stop position in the second direction to a first retry position located downstream of the restoration position in the first direction.

2. The image recording apparatus according to claim 1, wherein the first retry position is set between the restoration position and the first highest-load position.

3. The image recording apparatus according to claim 1, wherein the controller is configured to change the first retry position in accordance with the stop position in the retry processing executed when the stop position is located between the first highest-load position and the second highest-load position.

4. The image recording apparatus according to claim 1, wherein in the retry processing executed when the stop position is located between the first highest-load position and the second highest-load position, the controller sets the first retry position set when the stop position is located between the second highest-load position and an upstream end position of the second load region in the first direction, to a position located downstream, in the first direction, of the first retry position set when the stop position is located between the first highest-load position and the upstream end position of the second load region.

5. The image recording apparatus according to claim 1, wherein in the retry processing executed when the stop position is located between the first highest-load position and the second highest-load position, the controller determines a distance from the stop position to the first retry position set when the stop position is located between the second highest-load position and an upstream end position of the second load region in the first direction, to a distance greater than a distance from the stop position to the first retry position set when the stop position is located between the first highest-load position and the upstream end position of the second load region.

6. The image recording apparatus according to claim 1, wherein the controller is configured to, in the retry processing, move the carriage from the stop position to the target position when the stop position of the carriage which is detected by the detector is located downstream of the second highest-load position in the first direction and is different from the target position.

7. The image recording apparatus according to claim 1, wherein when the stop position of the carriage which is detected by the detector is located between the first highest-load position and a second retry position located upstream of the restoration position in the first direction, the controller in the retry processing moves the carriage to the second retry position and thereafter moves the carriage toward the target position.

8. The image recording apparatus according to claim 1, further comprising a notifier configured to notify an error occurrence,
 wherein the controller is configured to control the notifier to notify the error occurrence when the controller counts the number of executions of the retry processing, the number of executions of the retry processing reaches a particular number, and the stop position is different from the target position.

9. The image recording apparatus according to claim 1, wherein the first load applier comprises:
 a switching lever movable along an axis parallel with the moving path and pivotable about the axis between a first pivot position and a second pivot position, with a neutral position interposed therebetween;
 a first urging member configured to urge the switching lever toward the first pivot position when the switching lever is located nearer to the first pivot position from the neutral position than to the second pivot position, the first urging member being configured to urge the switching lever toward the second pivot position when the switching lever is located nearer to the second pivot position from the neutral position than to the first pivot position, the first urging member being configured to urge the switching lever in the second direction; and
 a guide configured to guide the switching lever toward the neutral position, and
 wherein the guide comprises:
 a first guide surface configured to guide the switching lever moving in the first direction, from the first pivot position toward the neutral position by contacting the carriage moving in the first direction toward the first pivot position; and
 a second guide surface configured to guide, from the second pivot position toward the neutral position, the switching lever urged by the first urging member and moving toward the restoration position in the second direction.

10. The image recording apparatus according to claim 1, wherein the second load applier comprises:
 a cap lever configured to move in the first direction by contacting the carriage moving the first direction;
 a cap movable between (i) a cap position at which the cap covers nozzles of the image recorder and (ii) a wait position located under the cap position, the cap being movable from the wait position to the cap position in conjunction with movement of the cap lever in the first direction; and
 a second urging member configured to urge the cap lever in the second direction.

11. The image recording apparatus according to claim 1, wherein the controller is configured to perform:

based on lowering of a speed of the carriage which is detected by the detector, detecting a position of a load applied from the moving path to the carriage and moving the carriage across the moving path;

first obtainment of obtaining the first highest-load position and the second highest-load position based on the detected position of the load; and second obtainment of obtaining the first retry position based on the first highest-load position and the second highest-load position obtained by the first obtainment.

* * * * *